US010624088B2

(12) United States Patent
Beale et al.

(10) Patent No.: US 10,624,088 B2
(45) Date of Patent: *Apr. 14, 2020

(54) INFRASTRUCTURE EQUIPMENT, COMMUNICATIONS DEVICE AND METHODS

(71) Applicant: SONY CORPORATION, Tokyo (JP)

(72) Inventors: Martin Warwick Beale, Basingstoke (GB); Chrysovalantis Kosta, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,337

(22) Filed: Nov. 19, 2018

(65) Prior Publication Data

US 2019/0090237 A1 Mar. 21, 2019

Related U.S. Application Data

(63) Continuation of application No. 15/554,747, filed as application No. PCT/EP2016/055452 on Mar. 14, 2016, now Pat. No. 10,136,432.

(30) Foreign Application Priority Data

Apr. 10, 2015 (EP) .................................... 15163295

(51) Int. Cl.
*H04W 72/04* (2009.01)
*H04B 7/06* (2006.01)
(Continued)

(52) U.S. Cl.
CPC ...... *H04W 72/0446* (2013.01); *H04B 7/0617* (2013.01); *H04L 1/0004* (2013.01);
(Continued)

(58) Field of Classification Search
CPC ... H04B 7/0617; H04L 1/0004; H04L 5/0023; H04L 5/0053; H04L 5/0091; H04W 72/0446; H04W 72/0453
(Continued)

(56) References Cited

U.S. PATENT DOCUMENTS 6,795,508 B1 9/2004 Odenwalder et al.
2011/0038275 A1* 2/2011 Kim ...................... H04W 48/16
370/252
(Continued)

FOREIGN PATENT DOCUMENTS

WO 2016/162158 10/2016

OTHER PUBLICATIONS

Harri Holma, et al,, "L TE for UMTS OFDMA and SC-FDMA Based Radio Access." Wiley, ISBN 978-0-470-99401-6, 2009, (4 pages).

(Continued)

*Primary Examiner* — Robert J Lopata
(74) *Attorney, Agent, or Firm* — Xsensus LLP

(57) ABSTRACT

An infrastructure equipment for a mobile communications network includes plural antennas, and is configured in a first mode of operation to transmit, from each of the plural antennas, reference signals in communications resource elements of the wireless access signals allocated to the plural antennas. The reference signals are transmitted in different communications resource elements of the wireless access interface for each antenna, so that a receiver can estimate a communications channel for each of the antennas, from the antennas to the receiver, from the transmitted reference signals. The infrastructure equipment is configured to switch between transmitting signals representing different data segments between subsets of the plural antennas to a second communications device, the signals being transmitted from (Continued)

each antenna subset representing different data segments for transmission to the second communications device, the transmitted signals being switched in at least one of time or frequency in accordance with a mapping.

12 Claims, 13 Drawing Sheets

(51) Int. Cl.
  *H04L 1/00* (2006.01)
  *H04L 5/00* (2006.01)
(52) U.S. Cl.
  CPC .......... *H04L 5/0053* (2013.01); *H04L 5/0091* (2013.01); *H04W 72/0453* (2013.01); *H04L 5/0023* (2013.01)
(58) Field of Classification Search
  USPC ........................................................ 370/312
  See application file for complete search history.

(56) References Cited

U.S. PATENT DOCUMENTS

| | | | |
|---|---|---|---|
| 2011/0188540 A1* | 8/2011 | Ohwatari | H04L 5/0044 375/130 |
| 2013/0010744 A1* | 1/2013 | Kang | H04B 7/0623 370/329 |
| 2013/0051489 A1* | 2/2013 | Singh | H04L 25/0212 375/295 |
| 2013/0114495 A1 | 5/2013 | Chen et al. | |
| 2013/0188577 A1* | 7/2013 | Papasakellariou | H04W 72/04 370/329 |
| 2013/0242824 A1 | 9/2013 | Lee et al. | |
| 2014/0301301 A1* | 10/2014 | Cheng | H04L 5/0048 370/329 |
| 2015/0245322 A1* | 8/2015 | Shimezawa | H04L 5/0053 370/329 |
| 2015/0381246 A1* | 12/2015 | Huang | H04B 7/0456 370/329 |
| 2016/0028453 A1* | 1/2016 | Zhou | H04B 7/0456 375/267 |
| 2016/0056977 A1* | 2/2016 | Wang | H04L 5/0048 370/336 |
| 2016/0112173 A1* | 4/2016 | Wang | H04L 5/0048 370/329 |
| 2016/0142228 A1* | 5/2016 | Wang | H04L 5/0023 455/67.11 |
| 2016/0234878 A1* | 8/2016 | Svedman | H04W 68/005 |
| 2018/0359073 A1* | 12/2018 | Frenne | H04L 5/0048 |

OTHER PUBLICATIONS

3rd Generation Partnership Project; Technical Specification Group Radio Access Network; Evolved Universal Terrestrial Radio Access (E-UTRA); Physical channels and modulation (Release 12), 3GPP TS 36.211 V12.4.0, Dec. 2014, (124 pages).
Research in Motion, "R1-120332 Further Discussion on Reference Signals for E-PDCCH," 3GPP TSG RAN WG1 Meeting #68, Feb. 6-10, 2012, (5 pages).
Stefania Sesia, et al., "L TE The UMTS Long Term Evolution From Theory to Practice," 2nd Edition, Wiey, Aug. 29, 2011; (Summary Only), (3 pages).
3rd Generation Partnership Project; Technical Specification Group Radio Access Network; Evolved Universal Terrestrial Radio Access (E-UTRA); Physical layer procedures (Release 12), 3GPP TS 36.213 V12.5.0, Mar. 2015, (239 pages).
Erik Dahlman, et al., "4G L TE/L TE-Advanced for Mobile Broadband," Science Direct, May 10, 2011 (Summary Only), (7 pages).
International Search Report dated Jun. 22, 2016 in PCT/EP2016/055452 filed Mar. 14, 2016.

* cited by examiner

INFRASTRUCTURE EQUIPMENT, COMMUNICATIONS DEVICE AND METHODS

CROSS-REFERENCE TO RELATED APPLICATIONS

The present application is a continuation application of U.S. application Ser. No. 15/554,747, filed Aug. 31, 2017, which is a national stage (under 35 U.S.C. 371) of International Patent Application PCT/EP2016/055452 filed Mar. 14, 2016, and claims priority to European Patent Application 15163295.7, filed in the European Patent Office on 10 Apr. 2015, the entire contents of each of which being incorporated herein by reference.

BACKGROUND

Field of Disclosure

Technical Field of the Disclosure

The present disclosure relates to infrastructure equipment for mobile communications networks, communications devices configured to communicate using mobile communications networks and methods for communicating with communications devices. In some embodiments a wireless access interface provided by the mobile communications network is configured to transmit signals representing data from a plurality of antennas, the signals also including reference signals for use by a receiver in estimating a channel through which the signals pass to the receiver from each antenna.

Background of the Disclosure

Mobile communications systems such as those which are being developed in accordance with the Long Term Evolution (LTE) project by the Third Generation Project Partnership (3GPP) can provide a facility for communications devices to transmit or receive data for a variety of applications with high data rates within a radio coverage area provided by a mobile communications network. A wireless access interface provided by the mobile communications network configured in accordance with an LTE standard includes signal transmission techniques which can support these high data rates. There is therefore expected to be a variety of applications, which can be supported by an LTE system.

Although there are applications which require high data rates to support their operation, there are some applications in which high data rates are not required. Indeed there are some applications which are expected to be provided by more simple, less complicated communications devices such as those supporting machine type communications (MTC). Such devices are also expected to be low power devices and may include a relatively in expensive low complexity transmitter and receiver. Such devices may also be disposed in locations in which radio communications conditions can make transmission and reception of signals more difficult.

It has been proposed for an LTE wireless access interface to provide an arrangement in which signals can be transmitted by an infrastructure equipment using a plurality of antennas. Antenna diversity techniques can be employed therefore to improve the integrity of the transmitted data. However communications devices which are less expensive and more simple in construction may not be able to perform more sophisticated detection techniques which are required to detect and to recover data from signals transmitted from a plurality of antennas.

SUMMARY OF THE DISCLOSURE

According to a first example embodiment of the present technique there is provided an infrastructure equipment for a mobile communications network. The infrastructure equipment includes a plurality of antennas, and is configured, in a first mode of operation, to transmit, from each of the plurality of antenna, reference signals in communications resource elements of the wireless access signals allocated to each of the plurality of antennas. The reference signals are transmitted from each of the antennas in different communications resource elements of the wireless access interface for each antenna, so that a receiver can estimate a communications channel for each of the plurality of antennas, from the antenna to the receiver, from the transmitted reference signals. The infrastructure equipment transmits in the first mode of operation, from each of the plurality of antennas, signals representing data in communications resource elements allocated for transmitting the data to a first of the communications devices, the signals representing the data being transmitted contemporaneously in the same communications resource elements from each antenna. In a second mode of operation, the infrastructure equipment is configured to determine a mapping for transmitting different data segments from each of a plurality of subsets of the plurality antennas to a second communications device using communications resource elements, which, for each antenna subset, are separated in at least one of time or frequency and to transmit an indication of the mapping for transmitting the data segments from each of the subsets of antennas to the second communications device. The infrastructure equipment is configured to switch between transmitting signals representing the different data segments between the subsets of the plurality of antennas to the second communications device, the signals being transmitted from each antenna subset representing different data segments for transmission to the second communications device, the transmitted signals being switched in at least one of time or frequency in accordance with the mapping so that to detect the data a receiver is required to generate a smaller number of channel estimates than the receiver would be required to estimate if the data was transmitted in the first mode. The communications resource elements which are used to transmit the reference signals from each antenna are the same in the first mode of operation as the second mode of operation.

Embodiments of the present technique can provide an infrastructure equipment which transmits signals representing data to be communicated using a plurality of antennas so that a receiver can detect and recover the data with a reduced complexity. This is because the infrastructure equipment is configured to switch between different antennas or sub-sets of antennas to transmit signals representing different portions or segments of the data to be communicated, the signals being transmitted on different communications resource elements of the wireless access interface. As a result, the receiver can detect and recover the data from a smaller number of channel estimates because the signals are transmitted from different antennas or different sub-sets of antennas. In one example the sub-set of antennas comprises only a single antenna.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with the same reference numerals and in which:

FIG. 7b is a schematic block diagram of a receiver for a communications device (UE) which is configured to detect and recover data received from signals transmitted from the infrastructure equipment of FIG. 7a;

DESCRIPTION OF EXAMPLE EMBODIMENTS

Conventional Communications System

Figure 1:
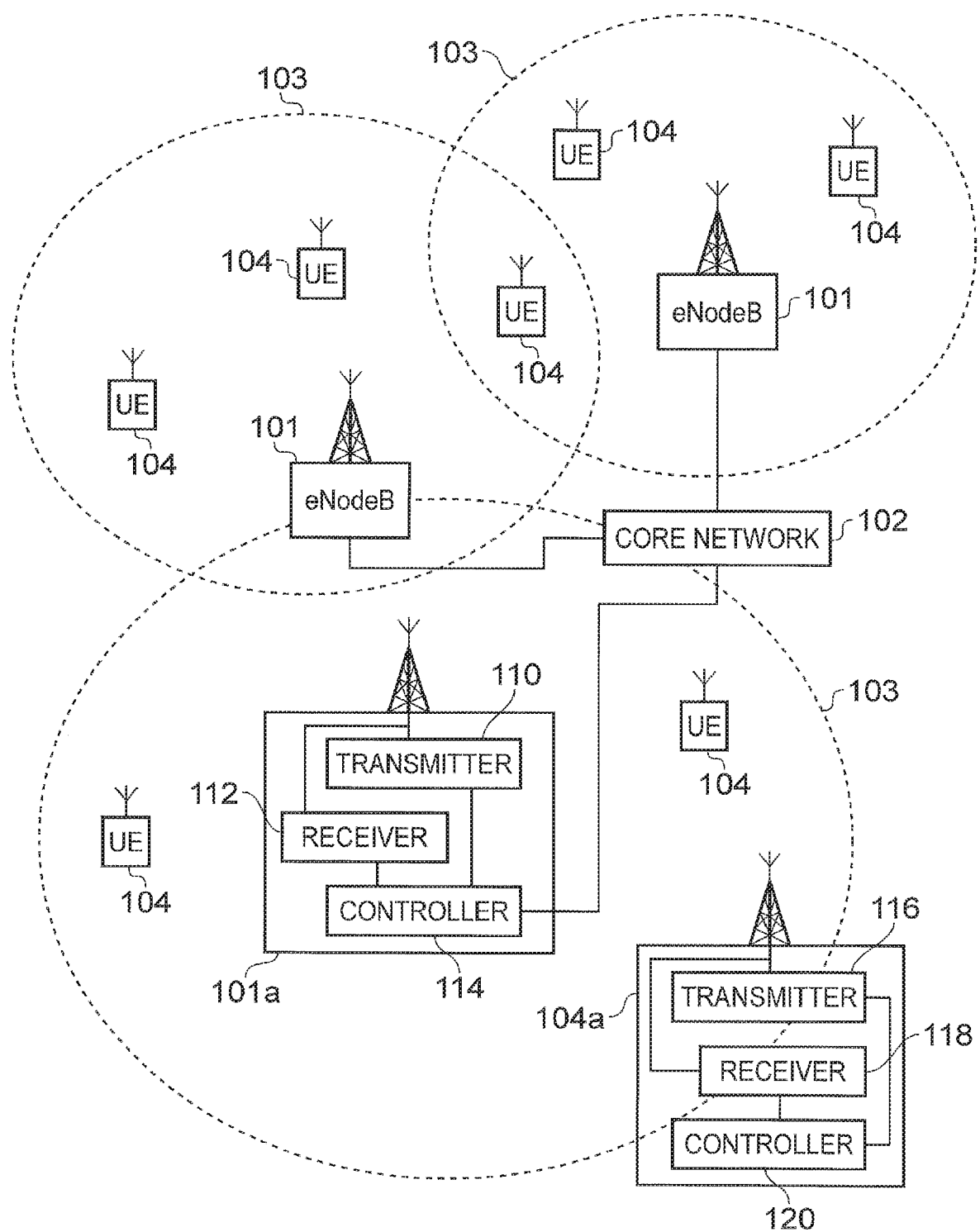
FIG. 1 provides a schematic block diagram of a mobile communications system in which communications devices are communicating via infrastructure equipment.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising infrastructure equipment 101 which are connected to a core network 102, which operates in accordance with a conventional arrangement which will be understood by those acquainted with communications technology. The infrastructure equipment 101 may also be referred to as a base station, network element, enhanced Node B (eNodeB) or a coordinating entity for example, and provides a wireless access interface to the one or more communications devices within a coverage area or cell represented by a broken line 103. One or more mobile communications devices 104 may communicate data via the transmission and reception of signals representing data via the wireless access interface. The core network 102 may also provide functionality including authentication, mobility management, charging and so on for the communications devices served by the network entity. The mobile communications devices of FIG. 1 may also be referred to as communications terminals, user equipment (UE), terminal devices and so forth.

The communications system may operate in accordance with any known protocol, for instance in some examples the system may operate in accordance with a 3GPP Long Term Evolution (LTE) standard.

As shown in FIG. 1, one of the eNodeBs 101a is shown in more detail to include a transmitter 110 for transmitting signals via a wireless access interface to the one or more communications devices or UEs 104, and a receiver 112 for receiving signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink. As shown in FIG. 1, the eNodeB 101a includes four antennas 122, 124, 126, 128 which serve to provide the eNodeB 101a with both transmission and reception diversity. For example, the four antennas 122, 124, 126, 128 can be used to provide space division multiplexing, or space block coding such as Alamouti coding when transmitting signals to a communications device 104a or form Multiple Input Multiple Output (MIMO) scheme or a Multiple Input Single Output (MISO) scheme.

Although the example eNodeB 101a has been shown with four antennas, it will be appreciated that this is just an example number of antennas and in other examples the number of antennas could be any number, such as for example one, two or eight.

An example UE 104a is shown in more detail to include a transmitter 116 for transmitting signals on the uplink of the wireless access interface to the eNodeB 103 and a receiver 118 for receiving signals transmitted by the eNodeB 101 on the downlink via the wireless access interface. The transmitter 116 and the receiver 118 are controlled by a controller 120 to transmit and receive signals respectively. In the example shown in FIG. 1, the UE 103a has a single antenna and therefore may co-operate with the eNodeB 101a to receive signals transmitted by the four antennas to implement a MISO scheme.

LTE Wireless Access Interface

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
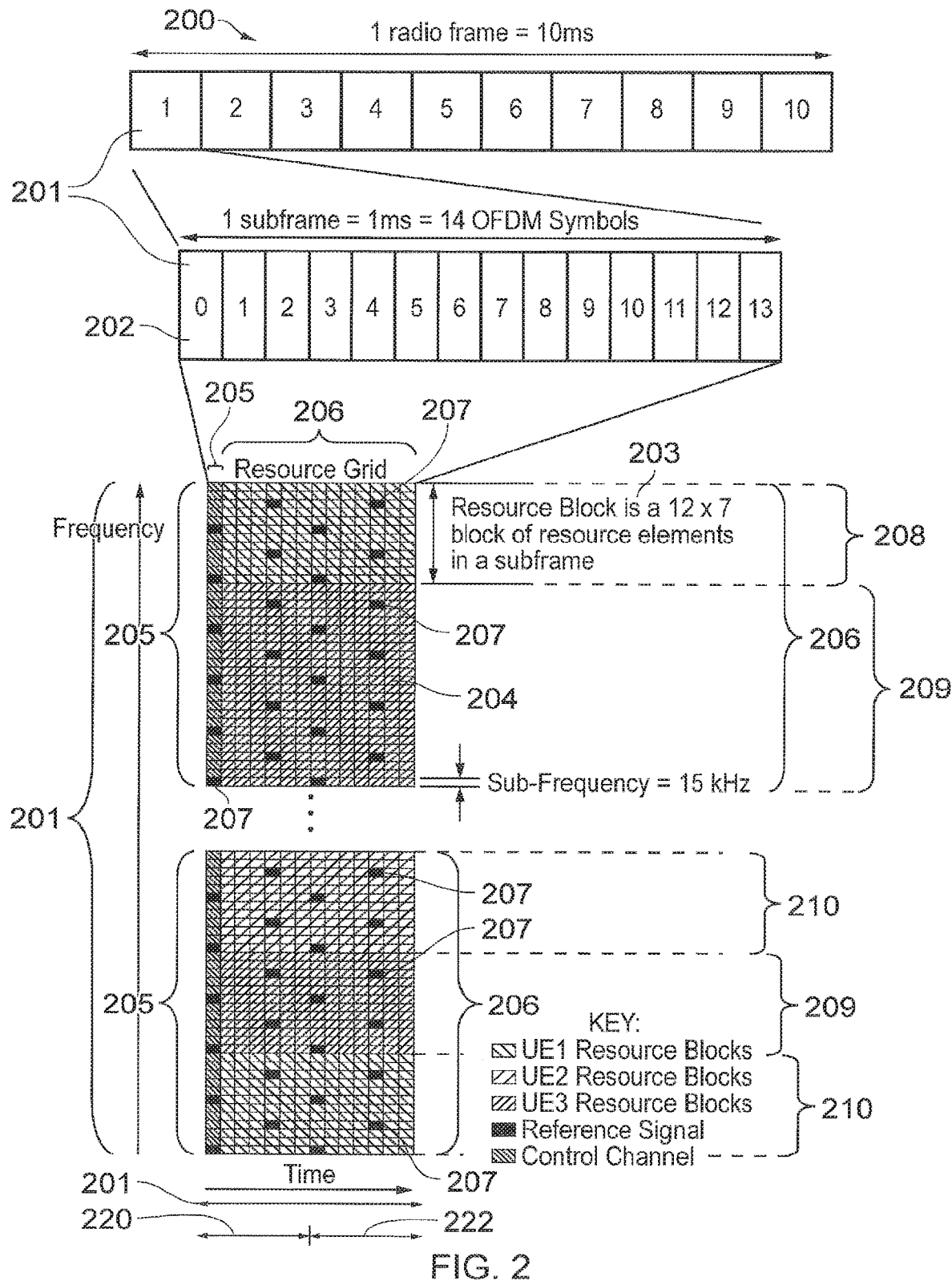
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot 220, 222 may be divided into physical resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1. However of particular relevance in understanding the example embodiments of the present technique are the downlink control channel referred to as the packet data control channel (PDCCH) and a shared channel of resources for transmitting data to UEs which is the packet data shared channel (PDSCH).

Figure 3:
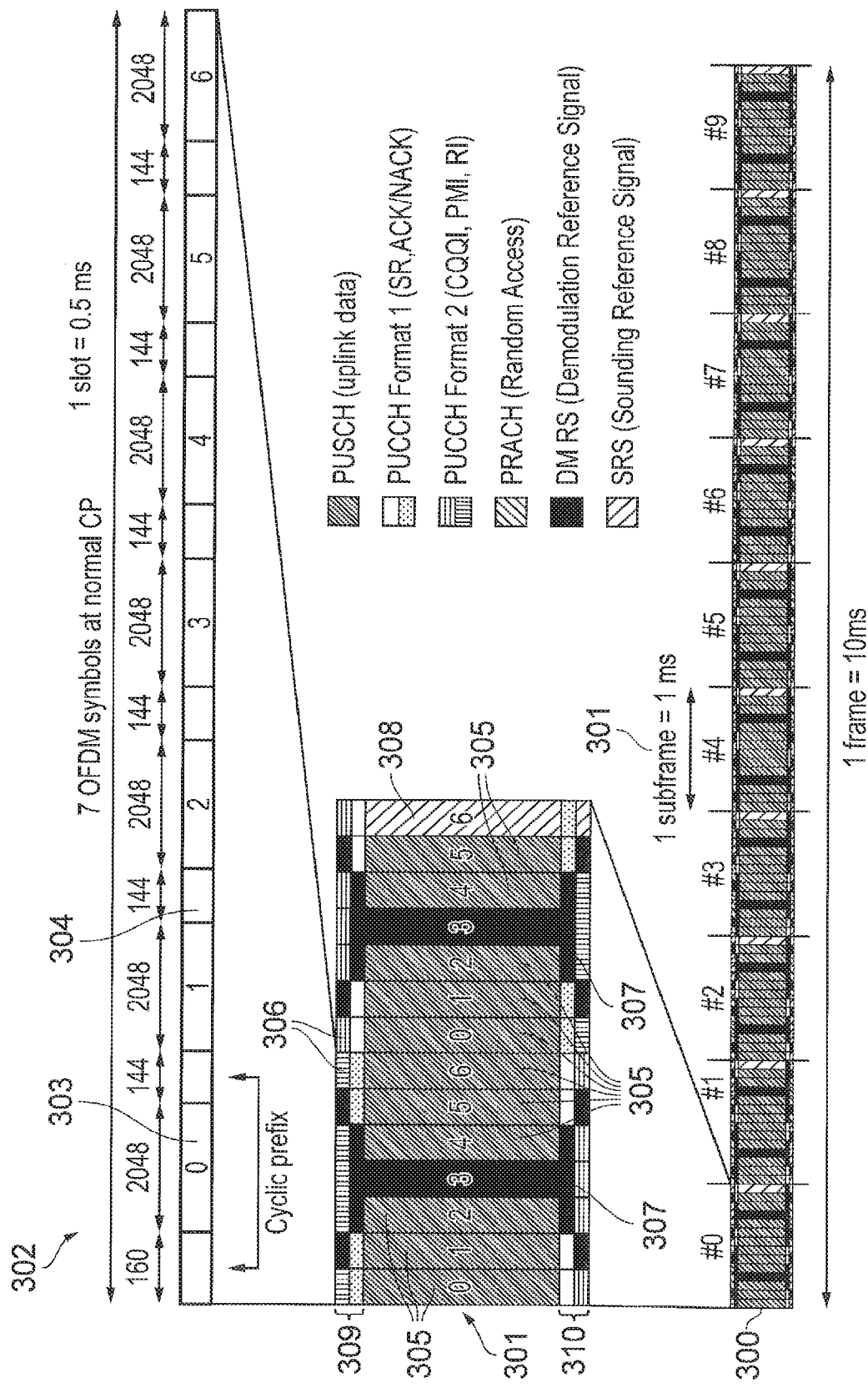
FIG. 3 provides a schematic diagram of an uplink of a wireless access interface of a mobile communications system operating according to an LTE standard.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

Switched Antenna Diversity to Reduce Detection Processing

Embodiments of the present technique can provide an arrangement for simplifying a detection process using reference signals which are transmitted within a wireless access interface in order to provide spatial diversity. Existing communications systems such as those arranged in accordance with LTE provide for the transmission on the downlink of specific reference signals by eNodeB from each of a plurality of antennas, referred in the following description as antenna ports. Thus the eNodeB 101a is provided with a plurality of antennas 122, 124, 126, 128 in order to perform beam forming or provide a MIMO or MISO scheme or space block coding. However, in order to implement a MISO scheme at a receiver, or perform Alamouti encoded data, it is necessary for a receiver to generate an estimate of each of the channels between the antenna ports to the receiver. As will be appreciated, generating a channel estimate for each physical resource block and for each antenna can represent a significant computational load for a receiver.

The embodiments of the present technique can provide an arrangement in which for each physical resource block (PRB) of a wireless access interface, a different antenna port is used from the eNodeB so that for any one time slot and PRB (separation in frequency), a receiver only needs to estimate a signal channel from a transmit antenna to a receive antenna, thereby reducing the amount of processing required in order to detect transmitted data and to achieve spatial diversity. In a conventional arrangement, in any PRB, a receiver must estimate a channel for each of the transmit antenna to receiver antenna pairs. Therefore by arranging for signals representing data to be transmitted from different ones of the antennas, separated in time or frequency (different PRBs) embodiments of the present technique can thereby significantly reduce a computational load required by a receiver to detect and to recover that data. Accordingly, a more simple and lower cost receiver can be deployed which can also utilise the diversity achieved by using antennas for each of the different physical resource blocks.

Embodiments of the present technique will now be explained with reference to an example of an LTE wireless access interface. As will be appreciated from the above explanation of a wireless access interface configured in accordance with an LTE standard, the wireless access interface includes in each subframe reference signals for use in estimating a channel through which a received signal has passed. In the downlink, the reference signals allow the UE to perform channel estimation on the channels between the $N_{TX}$ eNodeB transmit antennas and the $N_{RX}$ UE receive antennas. In total, $N_{TX} \times N_{RX}$ channel estimates are required by the UE in order to decode a transmission from the eNodeB.

There are two types of reference signals that can be applied by the eNodeB (for the purposes of allowing the UE to perform channel estimation). These are:
Cell specific Reference Signal (CRS). These reference signals are typically used for transmission of the PDCCH and PHICH. They are also used for transmission of the PDSCH in some transmission modes (such as TM1 and TM2)
DMRS (demodulation reference signal). These reference signals are used for transmission of the ePDCCH and can be used for transmission of the PDSCH in some transmission modes.

Figure 4:
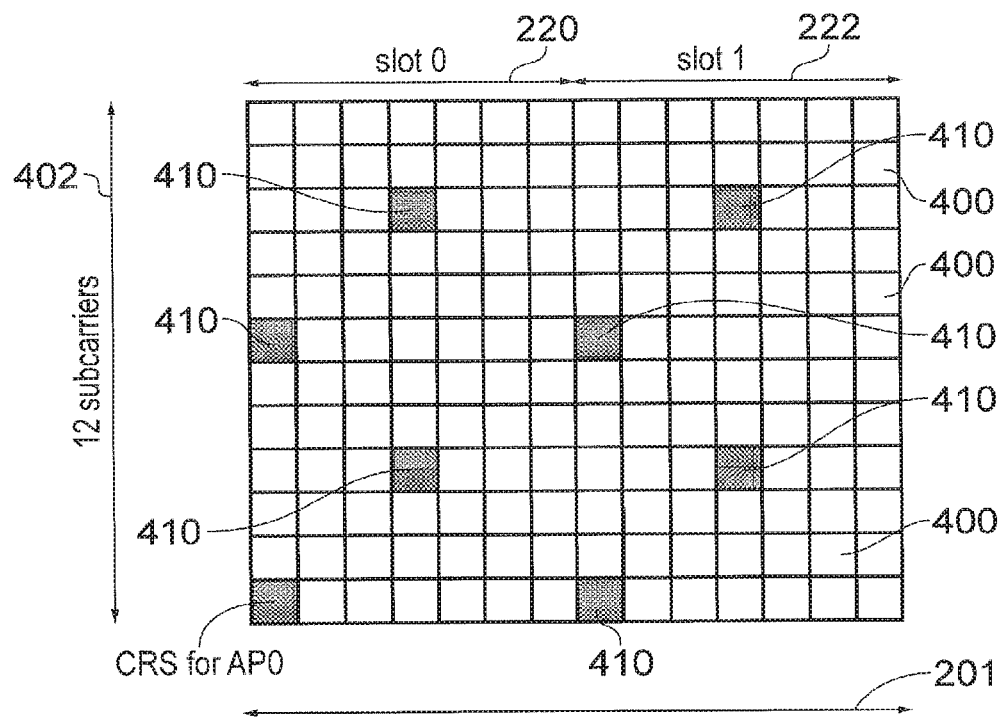
FIG. 4 provides a schematic representation of an example subframe of the downlink of the wireless access interface shown in FIG. 2, which illustrates the transmission of reference signals (CRS) in pre-designated communications resource elements for an infrastructure equipment (eNodeB) with single antenna port AP0.
Figure 5:
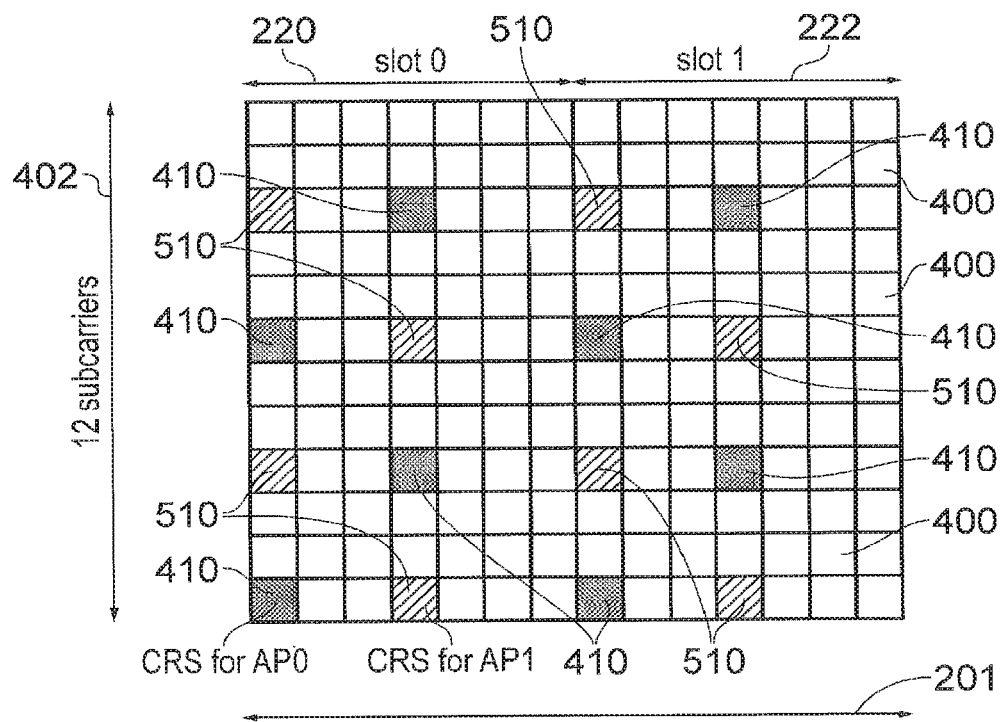
FIG. 5 provides a schematic representation of an example subframe of the downlink of the wireless access interface shown in FIG. 2, which illustrates the transmission of reference signals (CRS) in pre-designated communications resource elements for an infrastructure equipment (eNodeB) with two antenna ports AP0, AP1.
Figure 6:
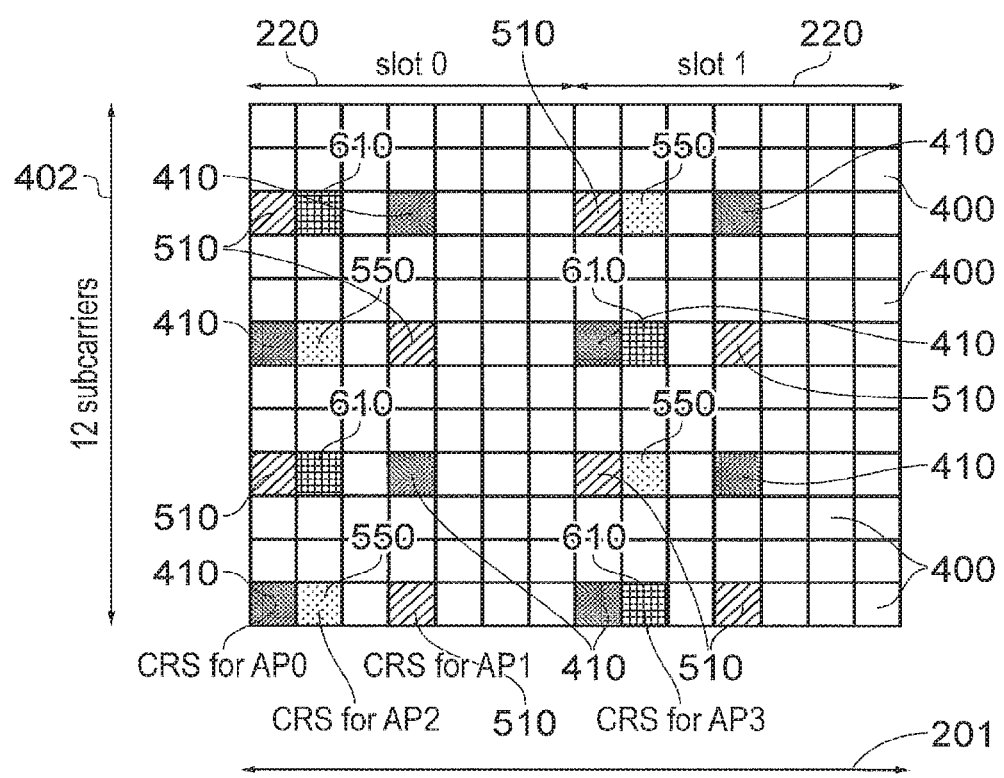
FIG. 6 provides a schematic representation of an example subframe of the downlink of the wireless access interface shown in FIG. 2, which illustrates the transmission of reference signals (CRS) in pre-designated communications resource elements for an infrastructure equipment (eNodeB) with four antenna ports AP0, AP1, AP2, AP3.

For CRS, the reference signal locations depend on the antenna port and the cell ID. FIGS. 4, 5 and 6 provide example representations of subframes showing the reference signal locations for an eNodeB with one, two and four antenna ports and cell ID 0. For each of FIGS. 4, 5 and 6 a single physical resource block (PRB)-pair is shown, where a PRB-pair consists of a first PRB occupying slot 0 220, consisting of seven OFDM symbols and twelve subcarriers; and a second PRB occupying slot 1 222, also consisting of seven OFDM symbols and twelve subcarriers.

FIG. 4 provides an illustrative representation of communications resource elements within a subframe 201 for each of two time slots 220, 222. Each of the white squares 400 within the subframe 201 represents a communications resource element such as a subcarrier of an OFDM symbol transmitted across the twelve subcarriers indicated by an arrow 402. The darker shaded blocks 410 represent CRS signals. For the example of FIG. 4, all of the signals of the subframe are transmitted from a single antenna, referred to as antenna port 0 (AP0). A different mapping of reference signals to resource elements applies for DMRS.

FIG. 5 provides a corresponding representation of a subframe 201 in which CRS symbols are transmitted from each of two antenna ports AP0, AP1. The CRS symbols transmitted from the first antenna port AP0 are shown as dark shaded blocks 410 whereas CRS symbols for the second antenna port AP1 are shown as hashed blocks 510.

FIG. 6 provides a corresponding example representation of a subframe 201 for CRS being transmitted by four antenna ports AP0, AP1, AP2, AP3 from the eNodeB. In addition to the reference signals transmitted by the first antenna port AP0 and the second antenna port AP1 410, 510 reference signals transmitted from a third antenna port AP2 are shown as polka dot 550 and from the fourth antenna port AP3 as hashed blocks 610.

As can be appreciated from the example subframes shown in FIGS. 4, 5 and 6, for an example in which an eNodeB has four transmit antenna ports, there are half as many reference signals per PRB pair for AP2 and AP3 as for AP0 and AP1. Referring to FIG. 6, AP0 is associated with eight reference signals in a single PRB pair whereas AP2 is associated with four reference signals in a PRB pair. It could hence be expected that the channel estimation accuracy for AP0 and AP1 is better than that for AP2 and AP3.

Example Transmitter/Receiver Architecture

Figure 7A:
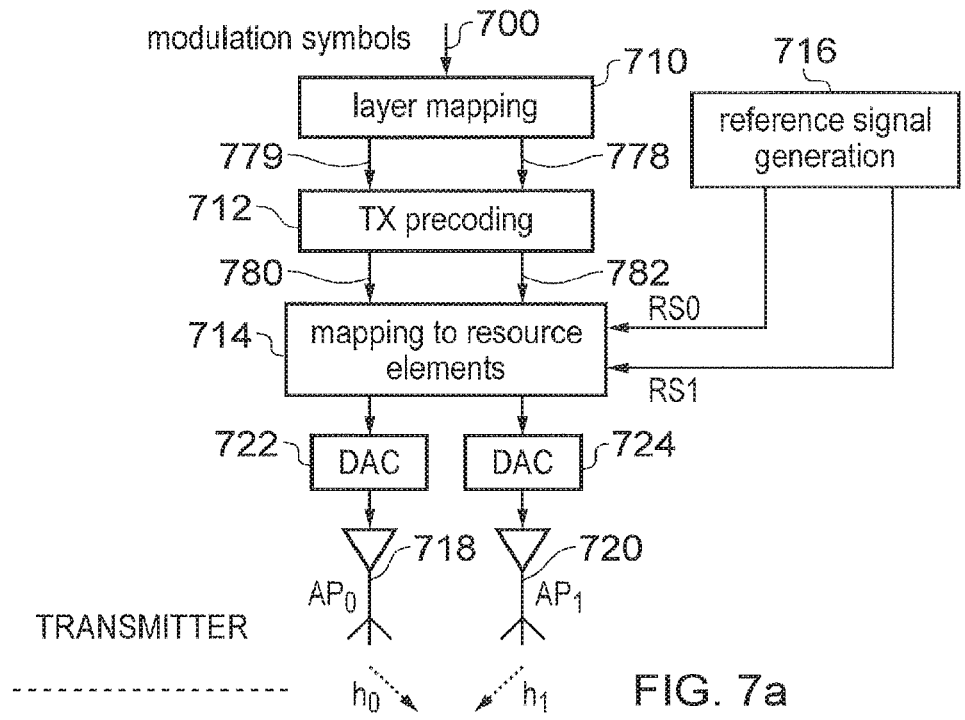
FIG. 7a is a schematic block diagram of a transmitter which transmits signals from an infrastructure equipment with two antenna ports AP0, AP1.

A schematic block diagram of a simplified transmitter, which utilises transmissions from a plurality of antenna ports to form either antenna diversity or a MISO or MIMO scheme is shown in FIG. 7a. As shown in FIG. 7a, modulation symbols are received on an input 700 and fed to a layer mapping block 710 which maps the modulation symbols between two layers 778, 779, a layer being a stream of modulation symbols sampled from the input stream of modulation symbols. An example mapping (3GPPTS36.211 section 6.3.3.3 [8]) of modulation symbols to layers would be to alternately map input modulation symbols to the two layers at the output of the layer mapping function. The modulation samples are then fed to a transmit pre-coding unit 712 and then fed to a mapping to resource elements block 714. A reference signal generation unit 716 generates the CRS or DMRS for transmission on first and second antenna units 718, 720. The digital output from the mapping to resource elements block 714 is converted to analogue form by digital to analogue converters 722, 724 and the separate signals contemporaneously transmitted from each of first and second antenna ports AP0, AP1 by transmit antennas 718, 720. As will be appreciated, some blocks which are required for an implementation of a transmitter have been omitted from FIG. 7a for simplifying the explanation of embodiments of the present technique, such an inverse Fourier Transform to convert the frequency domain modulation symbols into the time domain.

Figure 7B:
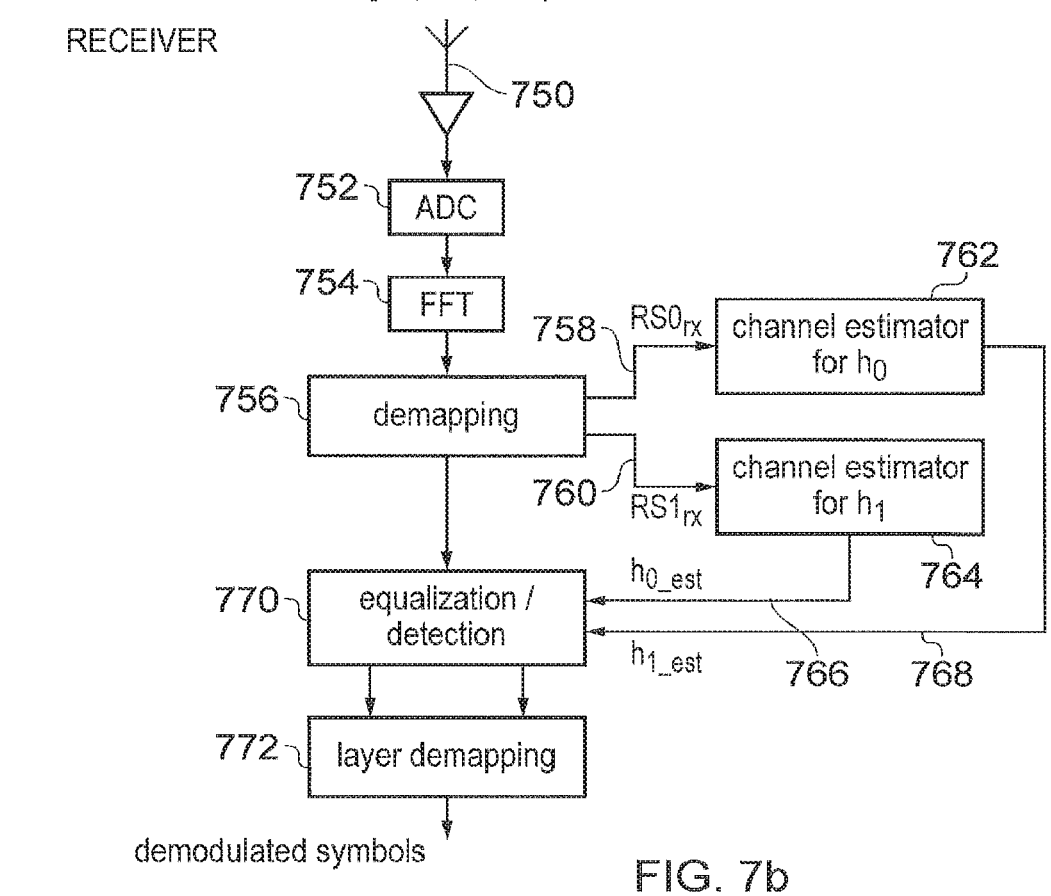

As shown in FIG. 7b, a receive antenna 750 detects signals transmitted from the first antenna port AP0 and the second antenna port AP1 from the antennas 718, 720 and feeds the received signal to an analogue digital convertor 752. A Fourier transform block 754 transforms the time domain received signal into the frequency domain and the signal is fed to a demapping unit 756. The demapping unit feeds on first and second outputs. 758, 760 the reference signals received respectively from the different transmit antennas 718, 720. Each of the different sets of reference signals are fed respectively to different channel estimators for the first antenna port AP0 762 and the second antenna port AP1 764 which each generates an estimate of the channel from respective antenna ports 718, 720 to the receive antenna 750. Thus the channel estimators 762, 764 feed an estimate of the channel from that transmit antenna 718, 720 to the receiver antenna 750 on output channels 766, 768. The demapping processor 756 then feeds the data carrying modulation signals to an equalising/detection processor 770. The equalisation/detection processor 770 subtracts the effects of the channel from the received data symbols and recovers an estimate of the data symbols from the received subcarriers represented by the detected signal. The equalised signal is then fed to a layer demapping processor 772 which reorders the bits or log-likelihood ratios (LLRs) produced by the equalisation/detection function into a stream of bits or LLRs representing the demodulated symbols. Therefore the recovered bitstream is fed on an output 774 to further decoding functions such as a deinterleaver and error correcting decoder (not shown).

The example transmitter and receiver architecture shown in FIG. 7a and FIG. 7b respectively provides an example of the lower layers of the transmit/receive processing for an LTE transmitter/receiver. The transmitter can operate with what is referred to in LTE terminology as a transmit mode two (TM2) using two transmit antennas. The receiver operates with transmit mode two using a single or plural receive antennas.

The present technique addresses a technical problem which can be appreciated from the parts of this transmit/receive processing chain shown in FIGS. 7a and 7b which are:
    LTE supports transmit diversity via the layer mapping and transmit precoding functions
    Separate reference signals are transmitted and embedded in the signal for each antenna port (AP0 and AP1)
    For the scenario shown in FIGS. 7a and 7b (two transmit antennas, one receive antenna), there are two channels from the eNodeB transmitter to the UE receiver. These are labelled as $h_0$ and $h_1$
    A channel estimator function is required for each of the channels from the eNodeB transmitter to the UE receiver. Each channel estimator is fed a stream of reference signals that pertain to the channel in question. The channel estimator produces two sets of channel estimates:
        a set of channel estimates $h_{0\_est}$ for the estimated channel from antenna port AP0 to the UE
        a set of channel estimates $h_{1\_est}$ for the estimated channel from antenna port AP1 to the UE
    Equalisation and detection operates on the two sets of channel estimates
Transmit Diversity Using Different Transmission Modes Various types of transmission precoding can be used to improve a likelihood of correctly communicating data using a plurality of available antennas. Embodiments of the present disclosure will be illustrated with respect to two example types of precoding, which are referred to transmission mode 1 (TM1) and transmission mode 2 (TM2) in LTE standards.

For the example of transmission mode 1 (TM1), the modulation symbols are transmitted as a simple "straight through" mapping where the output symbol is the same as the input symbol.

For the example of transmission mode 2 (TM2), the modulation symbols are transmitted in accordance with a precoding mapping based on 2×2 Alamouti codes. In accordance with the operation of TM2, when the eNodeB has two transmit antenna ports, if an input stream to the transmit precoder 712 is $x_0, x_1, x_2, x_3, \ldots$, then the transmit precoder 712 is configured to process the input stream to generate at respective outputs 780, 782 on transmit antenna port AP0 and transmit antenna AP1 the precoded modulation symbols $y_0$ and $y_1$ as shown in the table below:

| Antenna port | Subcarrier 0 | Subcarrier 1 |
| --- | --- | --- |
| AP0 | $y_0 = x_0$ | $y_1 = x_1$ |
| AP1 | $y_0 = -x_1^*$ | $y_1 = x_0^*$ |

In the table above, the indication '*' denotes the conjugate operation, $y_0$ is transmitted on the $0^{th}$ subcarrier and $y_1$ is transmitted on the $1^{st}$ subcarrier, $x_{2n}$ is on layer 0 and $x_{2n+1}$ comes from layer 1. A scaling factor of 1/sqrt(2) is applied to the transmission on each antenna port to ensure that the total power transmitted on each antenna port is unity.

When the eNodeB has four antenna ports, for an input stream to the transmit precoder 712 of $x_0, x_1, x_2, x_3, \ldots$, then the outputs on transmit antenna ports AP0, AP1, AP2 and AP3 are correspondingly formed as represented in the table below:

| Antenna port | Subcarrier 0 | Subcarrier 1 | Subcarrier 2 | Subcarrier 3 |
| --- | --- | --- | --- | --- |
| AP0 | $y_0 = x_0$ | $y_1 = x_1$ | — | — |
| AP1 | — | — | $y_2 = x_2$ | $y_3 = x_3$ |
| AP2 | $y_0 = -x_1^*$ | $y_1 = x_0^*$ | — | — |
| AP3 | — | — | $y_3 = -x_3^*$ | $y_4 = x_2^*$ |

In the above table, in a similar arrangement to the two transmit antenna case, the transmitted signal is scaled to ensure unit transmit power. There is no transmission on the antenna port/subcarrier combinations marked "-".

The above table shows that TM2 using four transmit antennas is equivalent to two copies of a 2×2 Alamouti code. Subcarriers 0 and 1 are transmitted using a 2×2 Alamouti code based on antenna ports AP0 and AP2. Subcarriers 2 and 3 are transmitted using an Alamouti code based on transmit antennas AP1 and AP3.

As indicated above a technical problem addressed by embodiments of the present technique is to reduce a complexity of detecting and recovering data which has been transmitted from different antennas. This is because, in accordance with a conventional arrangement for using a plurality of antennas and the reference signals transmitted for each antennas as illustrated in FIGS. 4, 5 and 6, there is a requirement to perform channel estimates on the channels from all of the eNodeB transmit antennas to the UE receive antennas. There is therefore an increase in the complexity and cost of implementing a UE which receives signals from a plurality of antennas. It would hence be desirable for there to be a transmit diversity scheme with reduced complexity compared to conventional arrangements, but with a performance gain provided by transmit antenna diversity. Embodiments of the present technique can therefore be used to simplify and therefore reduce a cost of implementing a UE and so finds application for implementing a UE for MTC. According to the present technique both a cost and a complexity of implementing a UE can be reduced. However, although the implementation of the receiver can be simplified, which might otherwise reduce an ability of the receiver to detect and recover data from received signals, a performance reduction is avoided or at least reduced because a detection performance gain is provided from using a plurality of transmit antennas.

Known arrangements which utilise a plurality of transmit antennas include the two Transmissions Modes referred to above as TM1 and TM2, with TM2 performing Alamouti coding. TM1 and TM2 are specified in:

TM1—3GPPTS36.211 section 6.3.4.1 [2]
TM2—3GPPTS36.211 section 6.3.4.2 [2]

Another technique for utilising a plurality of transmit antennas is referred to as random beam forming for an enhanced down-link control channel known as an ePDCCH for the LTE standards. A more detailed explanation of this technique is discussed in documents for example in R1-120332 "Further Discussion on Reference Signals for E-PDCCH". RIM UK Ltd, RAN1#68 [3]. For the example of random beam forming for a distributed ePDCCH, a different beam forming weight vector can be applied to each "eCCE" (enhanced control channel element). A beamforming weight vector is associated with a DMRS reference signal either from of two antenna ports, but an ePDCCH can consist of more than one eCCE, which means that the UE will have to perform channel estimates on two reference signals per PRB in order to decode the ePDCCH. An eCCE is a collection of resource elements that are all associated with the same DMRS and can exist in one or more PRBs. In the distributed ePDCCH case, an eCCE always exists in two or more PRB.

There are also known antenna switched diversity schemes. Switched antenna diversity techniques have been used for TD-CDMA. In TD-CDMA, the synchronisation signal can be transmitted by switched antenna diversity. In TD-CDMA, a UE can indicate a preferred transmit antenna to the NodeB. This indication provides a preferred antenna for a transmission. However, in contrast to the embodiments of the present disclosure TD-CDMA is a wideband signal that is not divisible on a frequency basis into PRBs as for the wireless access interface presented above.

A further example technique is Frequency Switched Transmit Diversity (FSTD) as disclosed in "LTE The UMTS Long Term Evolution: From Theory to Practice", $2^{nd}$ Edition, Wiley, S. Sesia, I Toufik and M. Baker 141. This is part of the LTE TM2 Alamouti scheme mentioned above but utilises four transmit antennas. In this scheme, for every four subcarriers:

two subcarriers are used to transmit a 2×2 Alamouti-coded codeword on antenna ports 0 and 2
the other two subcarriers are used to transmit a 2×2 Alamouti-coded codeword on antenna ports 1 and 3
the four subcarriers exist in the same PRB and all the antenna ports have an associated reference signal (i.e. there are 4 reference signals in the subframe).

As will be appreciated from the following explanation providing more detailed embodiments, the present technique differs from the abovementioned known arrangements because (1) embodiments reuse a subset of the available reference signals, which provides for compatibility for supporting conventional UEs, because the reference signals can be transmitted in the subframe in accordance with a pre-existing standard; (2) embodiments can provide a reduced complexity channel estimation, because channel estimates for all of the antenna ports are not required for every subframe; and (3) there is some flexibility in which antenna ports are used in which frequencies. An allocation of antenna ports to frequencies can be defined by signalling or can be pre-specified and therefore predetermined by defining which PRBs are associated with which antenna ports.

In the example of an LTE wireless access interface, channel state information can be signalled to the eNodeB by the UE. This channel state information is carried on the PUCCH or PUSCH channels.

Depending on transmission mode, this channel state information can consist of one or more of:

channel quality information (CQI)
precoding matrix indicators (PMI), which provides an indication of the preferred precoding to be applied to transmissions to the UE. The UE can indicate a preferred codebook index (3GPPTS36.211 section 6.3.4.2.3 [5]) to be applied to antenna precoding. The PMI reporting procedure is described in 3GPPTS36.213 section 7.2.4 [6]
rank indicators (RI), which provide an indication of a preferred number of modulation layers as a function of the channel for closed loop MIMO and beamforming schemes Accordingly the existing signalling arrangements can be used to allocate a preferred antenna to each PRB.

EXAMPLE EMBODIMENTS

Embodiments of the present technique can provide an arrangement of switched antenna transmit diversity performed on a per PRB or per PRB-pair basis, with the channel estimates being derived from reference signals such as, for example, the CRS of a wireless access interface, which have been provided for conventional antenna diversity schemes and therefore already exist to communicate with conventional UE.

In accordance with some embodiments an eNodeB is provided with an indication of a number of antenna ports which the UE can handle through either:

Pre-specification, for example the communications system is defined to indicate a maximum number of antenna ports for certain types of communications devices such as MTC UEs
By signalling the eNodeB from the UE to indicate a number of antenna ports the UE can decode, for example using an indication provided as part of an RRC connection setup, or through using a restricted set of PRACH preambles The eNodeB can also provide an indication of the number of antenna ports used for PDSCH transmission to UE such as UEs of a certain type, such as MTC UEs by either:

System Information Block (SIB) signalling
Master Information Block (MIB) signalling
Dedicated UE signalling (e.g. RRC signalling)

As will be appreciated therefore, embodiments of the present technique can provide a broadcast message such as a MIB and/or SIB for use by certain UE types, such as for example, for use with an MTC UE. In this case, the new broadcast message could use a transmit diversity scheme according to the present technique.

Accordingly, embodiments of the present technique can provide an arrangement for determining a transmit diversity scheme, for example mapping of antenna ports to PRBs, which could be known a-priori to the UE based on a pre-specified operation (e.g. via specification) or could be determined by the UE by blind decoding.

Embodiments of the present technique can use for example the following forms of switched antenna transmit diversity:

A two transmit antenna scheme performed by an eNodeB, which can switch on an open loop basis between use of one of the two antennas, but only one antenna transmits, such that alternate PRB-pairs use alternate antennas.

A four transmit antenna scheme performed by an eNodeB, which can switch in an open loop fashion
  between use of one of the four antennas, only one antenna transmits; or
  between pairs of two antennas, for example switching between a 2×2 Alamouti scheme using antennas 0 and 1; and an Alamouti scheme using antennas 2 and 3

According to one example embodiment, even antenna ports are allocated to even PRBs and odd antenna ports AP1, AP3 are allocated to transmit odd PRBs as represented in the table below. According to this arrangement, transmissions from each of the antennas are separated in frequency in accordance with the frequency domain resources of each PRB. This arrangement can provide for a transmission of different sections of data from different antennas and that signals are not transmitted from more than one antenna at the same frequency at the same time.

| PRB-pair | Antenna ports used |
|---|---|
| 0 | AP0, AP2 |
| 1 | AP1, AP3 |
| 2 | AP0, AP2 |
| 3 | AP1, AP3 |
| 4 | AP0, AP2 |
| 5 | AP1, AP3 |

According to an example embodiment an eNodeB could cycle between transmit antennas, which are used in the 2×2 Alamouti scheme. For example the following antenna ports could be used for the Alamouti scheme in different PRBs:

| PRB-pair | Antenna ports used |
|---|---|
| 0 | AP0, AP2 |
| 1 | AP1, AP3 |
| 2 | AP0, AP3 |
| 3 | AP1, AP2 |
| 4 | AP0, AP1 |
| 5 | AP2, AP3 |

For the above example embodiment alternate PRBs use alternate pairs of antennas.

Figure 8:
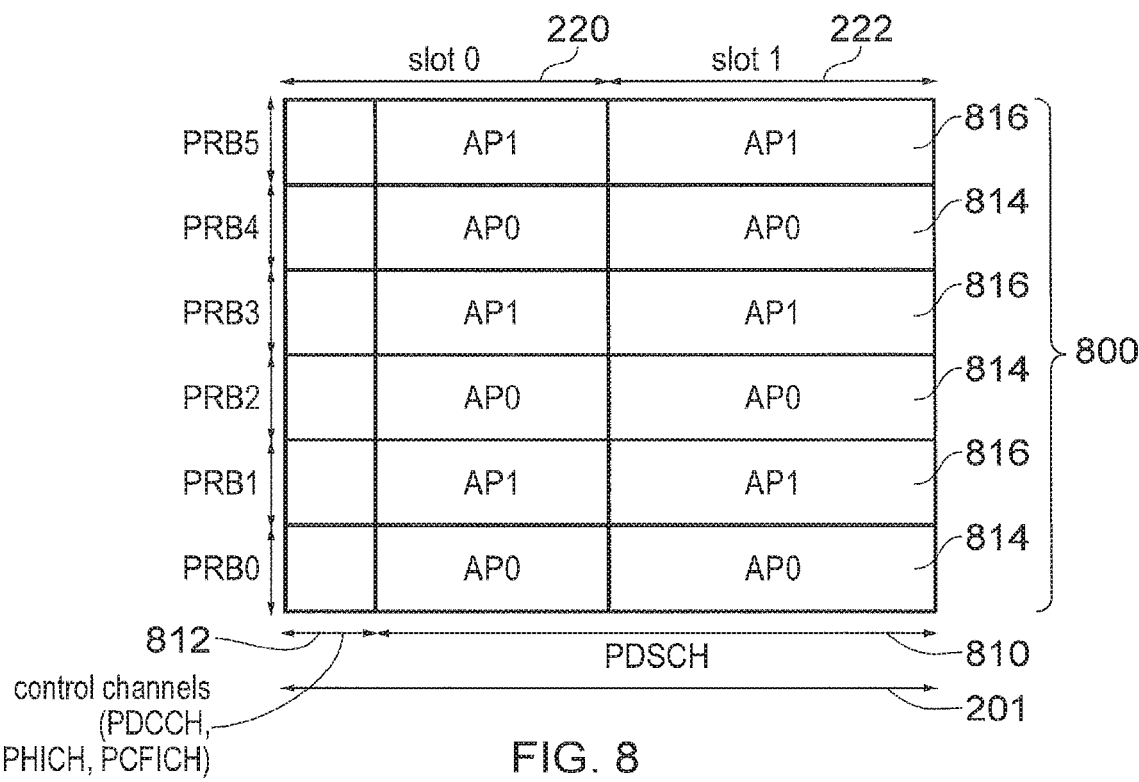
FIG. 8 provides a schematic representation of an example subframe of the downlink of the wireless access interface shown in FIG. 2, which is transmitted by an infrastructure equipment according to the present technique using two antenna ports AP0, AP1 alternating between physical resource blocks.

An example illustration of subframe configured in accordance with the present technique is showing in FIG. 8. In FIG. 8, six physical resource blocks 800 are shown which include within two timeslots shared channel resources within a PDSCH 810 as well as a control channel region 812. As shown by the relative shading in FIG. 8, in accordance with the present technique a first antenna port (AP0) is arranged to transmit on even physical resource blocks 814 and darker shaded odd physical resource blocks are transmitted using a second antenna port (AP1) 816.

According to the embodiment shown in FIG. 8 a controller in the eNodeB is arranged to cycle through the antenna ports, AP0. AP1 (as a function of the PRB) for a single subframe. This same mapping between antenna ports and PRBs can be used for each subframe, or the mapping can be changed from subframe to subframe (according to a predetermined/pre-known pattern). A benefit can be provided by changing the mapping from subframe to subframe when a channel is repeated at the physical layer (e.g. for the purposes of coverage extension). In the case of repetition, antenna diversity is achieved for each PRB (as well as there being antenna diversity between PRBs).

Figure 9:
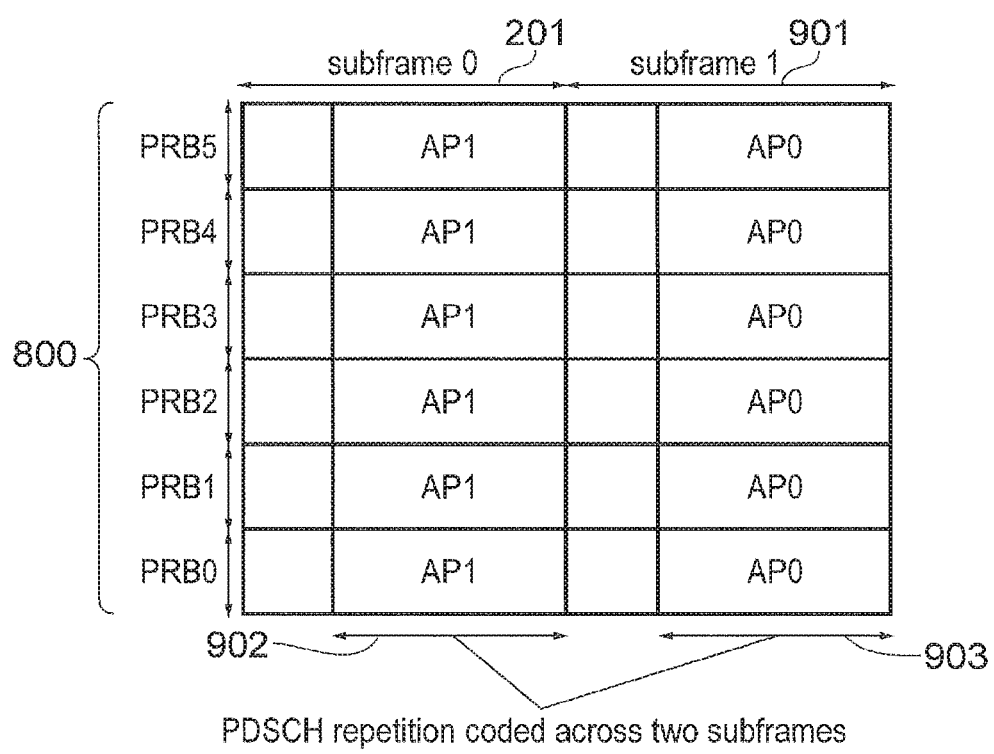
FIG. 9 provides a schematic representation of an example of the downlink of the wireless access interface shown in FIG. 2, which is transmitted by an infrastructure equipment according to the present technique using two antenna ports AP0. AP1 alternating on a subframe basis and using repeated transmission to provide coverage extension.

In a further example embodiment, an antenna diversity arrangement according to the present technique can be combined with a repeated transmission in order to provide, for example, coverage extension, so that a receiver can combine repeatedly transmitted signals representing the same data. According to this example, which is presented in FIG. 9, a first of two antenna ports (e.g. AP1) can be used for transmitting the data in a first subframe 0 201 for all of the PRBs in that first subframe 210 and a second of two antenna ports (AP0) can be used for transmitting the data in a second subframe 901 for all of the PRBs of that subframe 1 901. In each subframe 201, 901, legacy reference signals are transmitted as explained above with reference to FIGS. 4, 5 and 6. (e.g. the set of reference signals shown in FIG. 6), but the data transmission in any one subframe is only associated with a subset of the available antenna ports and hence with a subset of the reference signals. When the UE decodes a complete set of repeated subframes, it will deinterleave and decode data that has been transmitted using a plurality of antenna ports, but in any one subframe, the UE can generate channel estimates for a reduced subset of channels, each channel corresponding to a transmit antenna port/receive antenna port pair. For the example shown in FIG. 9, the UE will achieve antenna diversity across antenna ports AP0 and AP1 when repetition decoding the two subframes 902, 903 illustrated, but in any one subframe 902, 903 the UE will only have to a channel estimate for either of the two antenna ports AP0 or AP1.

Figure 10:
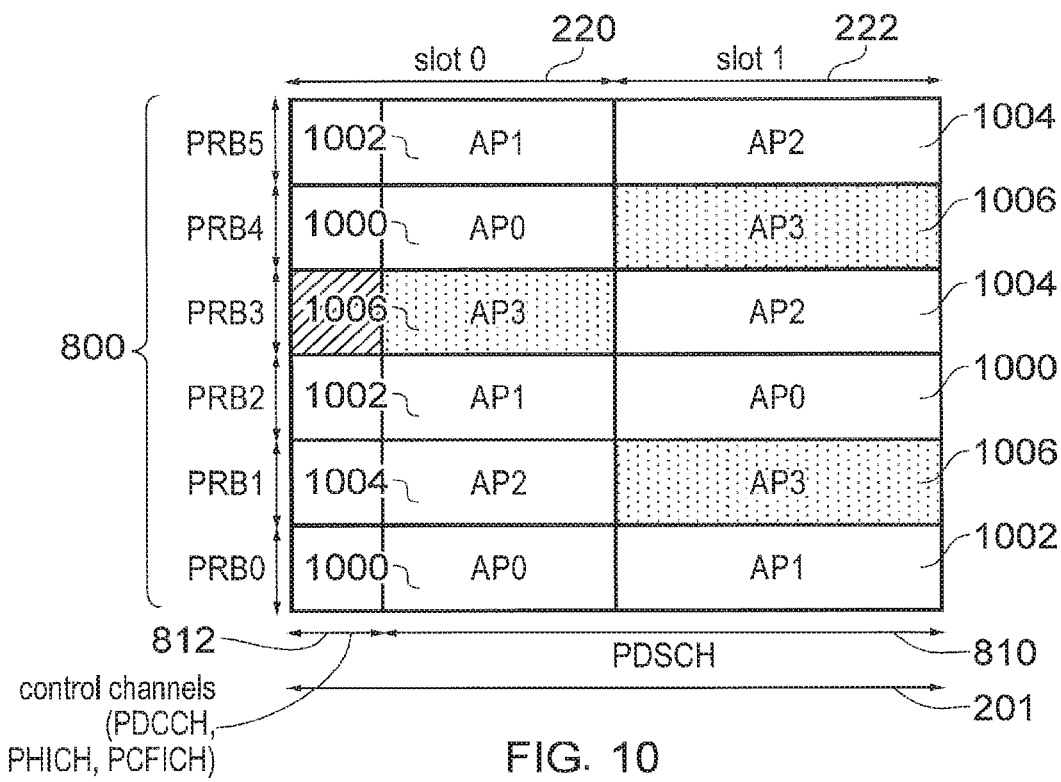
FIG. 10 provides a schematic representation of an example subframe of the downlink of the wireless access interface shown in FIG. 2, which is transmitted by an infrastructure equipment according to the present technique using four antenna ports AP0, AP1, AP2, AP3 switched between time slots of the subframe.

A further example aspect of the present technique is shown in FIG. 10 which shows the corresponding subframe 201 to that shown in FIG. 8 but arranged to transmit using four antenna ports AP0, AP1, AP2, AP3. This figure additionally shows the mapping between antenna ports and PRBs changing on a per-slot basis, hence in a single PRB antenna diversity is created between two antenna ports. As shown in FIG. 10, the lightest shading resource is transmitted for even physical resource blocks 1000 in alternate timeslots 220, 222 on the first antenna port AP0. The next lightest shaded resource is also transmitted on even physical resource blocks but alternating with a first antenna port and transmitted on the second antenna port 1002. A third antenna port AP2 is used to transmit a next darker shaded communications resource on the odd physical resource blocks in alternate timeslots 1004 and the fourth antenna port AP3 is used to transmit odd physical resource blocks multiplexed with AP2 in the darkest shaded resource 1006.

In some examples a two transmit antenna scheme or four antenna scheme can be switched at the PRB level (PRB=twelve subcarriers, one time slot 220, 222) rather than at the PRB-pair level (PRB=12 subcarriers, two time slots 220, 222). This example embodiment can provide an advantage in increasing frequency diversity, which can be achieved, which is especially relevant for a slowly fading channel where the channel in slot 0 220 is almost the same as that in slot 1 222, but could impair the channel estimation performance. The mapping shown in FIG. 10 provides both time and frequency diversity between four antenna ports AP0, AP1, AP2, AP3. This example embodiment provides an arrangement in which the data or control channels can be mapped to antenna ports in a way which cycles between the maximum number of antenna ports and applies AP0 and AP1 in preference, which can provide antenna ports with the best channel estimation performance as explained above.

Figure 11:
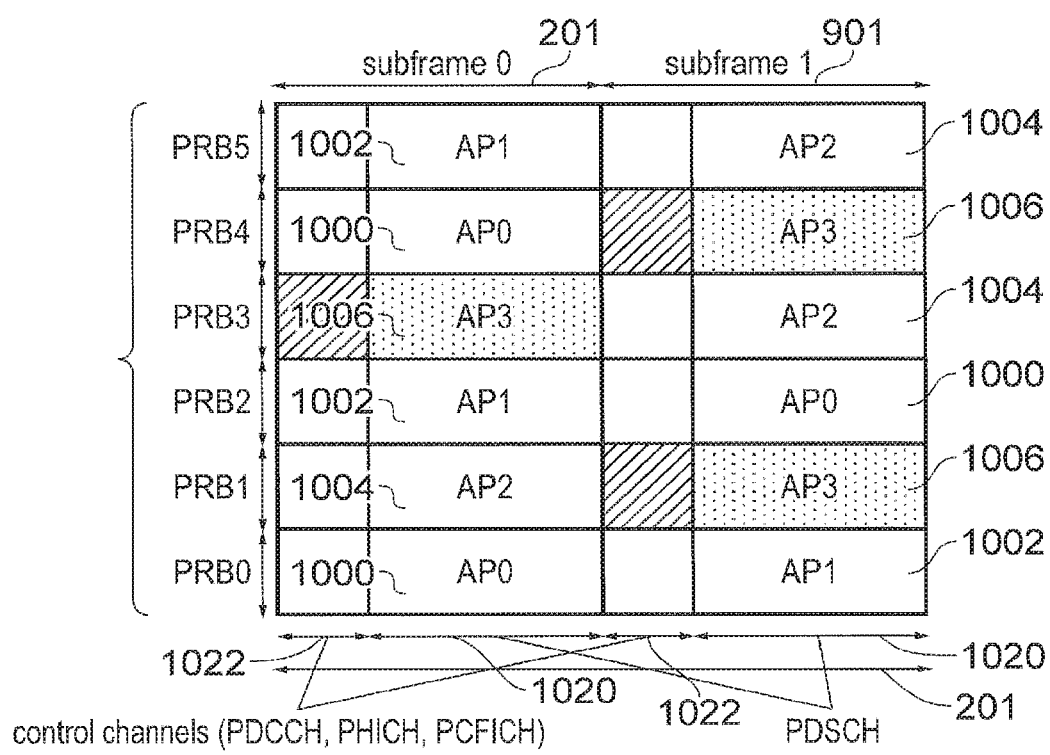
FIG. 11 provides a schematic representation of an example of the downlink of the wireless access interface shown in FIG. 2, which is transmitted by an infrastructure equipment according to the present technique using four antenna ports AP0, AP1, AP2, AP3 alternating on a subframe basis according to a further example.

FIG. 11 shows a further example embodiment of the present technique in which four antennas AP0, AP1, AP2, AP3 are switched on a subframe basis and between physical resource blocks. Thus antenna ports AP0 and AP1 are used to transmit from even physical resource blocks alternating on a subframe basis (for example between subframe 0 201 and subframe 1 901) and the second and third antenna ports AP2, AP3 are used to transmit on odd resource blocks alternating between subframes (subframe 0 201 and subframe 1 901). Either of the antenna pairs is multiplexed between the subframes, 201, 901.

FIG. 11 illustrates an example embodiment in which an eNodeB cycles through a mapping of each of the antenna ports AP0, AP1, AP2, AP3 to PRB on a per-subframe basis. This example embodiment shows, in comparison to FIG. 8, that each PRB (e.g. PRB0) achieves antenna port diversity, for example between antenna port AP0 and AP1 for a PDSCH transmission 1020 repeated between subframes 0 and 1 201, 901. Even when repetition is not applied, there may be a benefit in cycling the antenna port to PRB mapping since this can reduce the disparity of probability of block error on PDSCH 1020 or the control channels 1022 between PRBs. As can be seen in FIG. 11, control channels such as the PDCCH, PHICH, PCFICH are transmitted in a control region 1022 of the time slots from different antenna ports AP0, AP1, AP2, AP3.

A further example embodiment can provide an arrangement in which a UE can signal to the eNodeB a preference of which PRBs should be transmitted on each of the antennas. This can be done, in a closed loop manner, based on feedback from the UE, for example using channel state reports. Closed loop schemes may be particularly appropriate for stationary devices, for example smart meters for which the channel changes very slowly. The following are examples of feedback techniques for specifying the antenna which should be used to transmit each PRB:

For each PRB, a UE could identify and indicate to the eNodeB the transmit antenna from which a signal has been transmitted and received with the greatest amount of power. In other examples the UE could identify one of the transmit antenna from which a signal is transmitted and received with the highest signal to noise ratio. A measurement and reporting process may consider that an effective noise power per transmit antenna might change. For example as illustrated by the example in FIG. 6 that the channel estimate accuracy for AP2 and AP3 is worse than for AP0 and AP1 due to the lower number of reference signals available.

A UE could perform an overall power measurement on a signal received from each transmit antenna and report a preferred antenna based on a measured power from each antenna for each of the PRBs. This may require that the eNodeB matches each of the UEs to a different antenna preference when scheduling transmission resources and may be therefore more complicated.

When there are 2×N PRBs, the UE can indicate which "N" PRBs it would prefer to come from a first antenna port AP0 which would implicitly identify that the other "N" PRBs should be transmitted from a second antenna port AP1, for a two antenna example. This mode would ensure that an equal amount of power is transmitted by each eNodeB transmit antenna (thus not overloading one of the eNodeB transmit antennas).

An eNodeB could switch between open loop schemes and closed loop schemes as a function of UE speed and therefore a rate of change of the channel (closed loop schemes might only be used for stationary or almost stationary UEs).

As will be appreciated, the above schemes described above can be readily applied to PDSCH. PDCCH. PHICH and PCFICH channels. The scheme can be applied to ePDCCH if the ePDCCH uses the CRS in combination with the DMRS, including a known mapping between the DMRS and CRS.

Figure 12A:
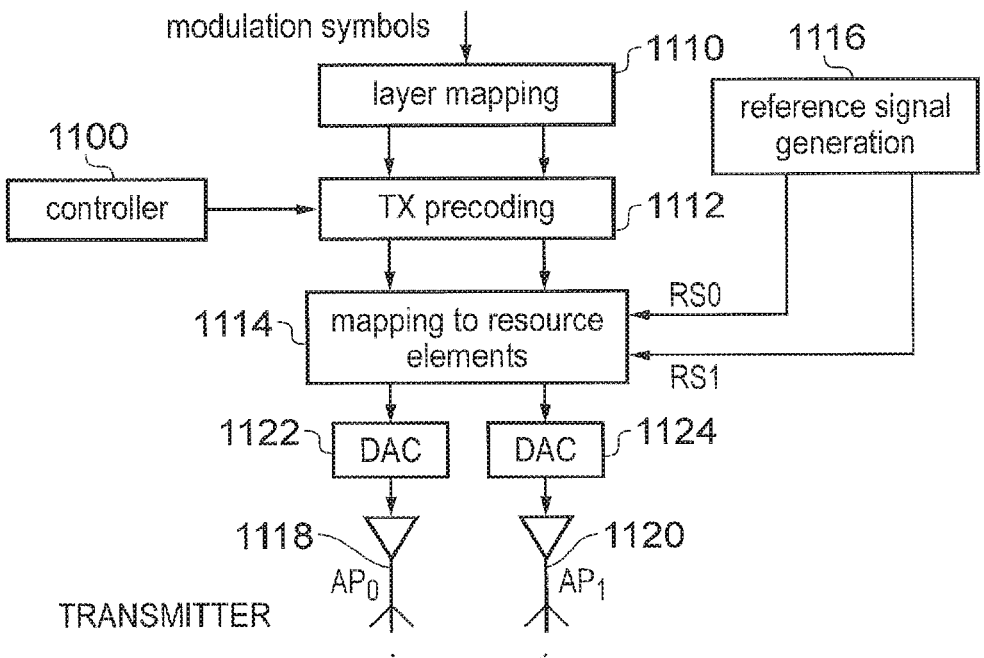
FIG. 12a is a schematic block diagram of a transmitter which transmits signals from an infrastructure equipment with two antenna ports AP0, AP1 according to an example embodiment of the present technique.
Figure 12B:
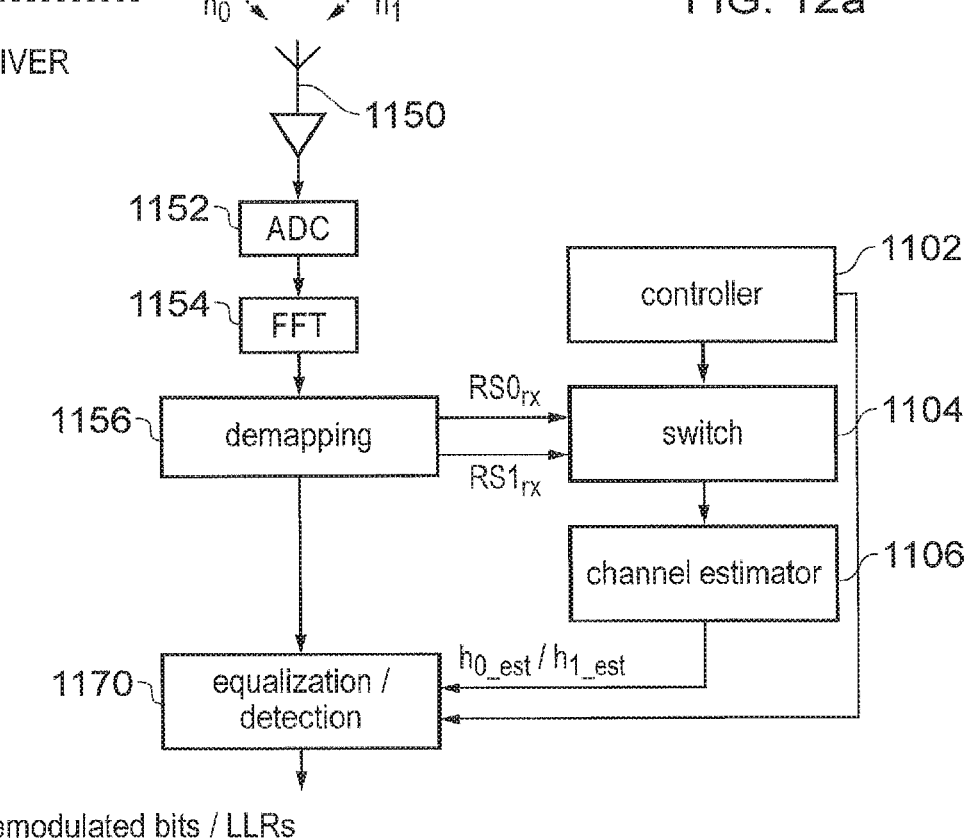
FIG. 12b is a schematic block diagram of a receiver for a communications device (UE) which is configured to detect and to recover data received from signals transmitted from the infrastructure equipment of FIG. 12a according to the present technique.

FIGS. 12*a* and 12*b* provide a respective transmitter and receiver example block diagrams which are configured to implement embodiments of the present technique. The transmitter and receiver shown in FIGS. 12*a* and 12*b* correspond substantially to the receiver showing in FIGS. 7*a* and 7*b* and so only the differences will be explained.

In FIG. 12*a*, the layer mapping block 1110 is configured to form two identical streams of data. One layer is for transmission on the first antenna port, AP0, the other for transmission on the second antenna port AP1. If there were four transmit antennas then the layer mapping block 1110 would generate four data streams, which would not be identical for the case of four transmit antennas because for this example, the transmission consists of 2×2 Alamouti constructions applied to different PRBs.

As shown in FIG. 12*a*, a controller 1100 controls the transmitter precoder 1112 so that only data is transmitted on alternate PRBs for each of the two antennas 1118, 1120 in accordance with the present technique. The controller 1100 identifies which symbols in each stream are active for each antenna port, as a function of the PRB-pair. Accordingly, the transmitter precoder 1112 is configured under the control of the controller 1100 to encode the symbols on each stream so that they are either active or inactive.

The reference signal generator 1116 corresponds to that shown in FIG. 7*a*, and as explained above, generates reference signals for the first and second antenna ports AP0. AP1. As such, the reference signals are allocated to communications resource elements as already explained above in accordance with a conventional operation such as that specified according to the LTE Standard. As for the example shown in FIG. 7*a*, the mapping to resource elements block 1114 is configured to map the reference signals (CRS) to the appropriate resource elements for AP0 and AP1, irrespective of the PRB-pair. According to the arrangement shown in FIG. 12*a*, symbols on each stream are mapped to resource elements and inactive symbols are not actually transmitted.

As shown in FIG. 12*b* in the receiver, a controller 1102 is arranged to control a switching unit 1104 and an equalisation and detection unit 1170. The controller 1102 controls a switch 1104 to alternately switch the reference signals received respectively from the different PRBs to the channel estimator in order to produce channel estimates from the first antenna 1118 on AP0 or the second antenna 1120 AP1 only for those PRBs where the receiver has active data from that transmit antenna. Thus is shown in FIG. 12*b* only a single channel estimator 1106 is required because the receiver shown in FIG. 12*b* is never required to estimate two channels for each physical resource block at any time or at least the number of channel estimates is reduced in accordance with a reduced number of the antennas on which the transmitter of FIG. 12*a* has transmitted. That is to say, for a two transmit antenna example, such as that of FIG. 12*a*, for each PRB only a single channel estimate is required at any one time because the signal is only transmitted from one of the two antennas 1118, 1120 for any PRB as controlled by the controller 1100. Thus the demapping block 1156 operates conventionally as per the example of FIG. 7b to recover the reference signals from the communications resource elements on which they are transmitted for both of the two antenna ports AP0, AP1. However, the receiver controller 1102 controls the switching block 1104 and the channel estimator 1106 as a function of each PRB-pair to indicate which data symbols were transmitted on the first antenna port AP0 and which on the second antenna port AP1 and to indicate which reference signals (CRS) are to be used for generating a channel estimate for the current PRB-pair. The switching unit 1104 then switches between reference signals RS0 (for AP0) and reference signals RS1 (and AP1) which are sent to the channel estimator 1106. The channel estimator 1106 then estimates the channel on a PRB by PRB basis, based on the input stream of reference signals. The equalisation and demodulation unit 1170 therefore equalizes and detects/demodulates the received data symbols, based on the channel estimates produced by the channel estimates 1106, under the control of the receiver controller 1102.

According to embodiments of the present technique therefore a transmitter, such as the transmitter shown in FIG. 12a is configured to operate in two modes. In a first mode of operation, the controller 1100 controls the transmitter to transmit, from each of the plurality of antennas, reference signals in communications resource elements of the wireless access signals allocated by the controller 1100 to each of the plurality of antennas. The reference signals are transmitted from each of the antennas in different communications resource elements of the wireless access interface for each antenna, so that a receiver can estimate a communications channel for each of the plurality of antenna, from the antenna to the receiver, from the transmitted reference signals. The transmitter also transmits, from each of the plurality of antennas, signals representing data in communications resource elements allocated by the controller for transmitting the data to one of the communications devices, the signals representing the data being transmitted contemporaneously in the same communications resource elements from each antenna. The first mode therefore represents a conventional mode of operation, in which the data is divided into data segments, each PRB carrying a segment of the data. Signals representing the data segment are transmitted from each antenna of the array. However, in accordance with the present technique, in a second mode of operation, the controller 1100 controls the transmitter to switch between transmitting signals representing data from each of the plurality of antennas to a communications device, the signals being transmitted from each antenna representing different data for transmission to the communications device. The transmitted signals are switched in time and/or frequency so that to detect the data a receiver is required to generate a smaller number of channel estimates than the receiver would be required to estimate if the data was transmitted in the first mode. The transmitter is arranged to switch between transmitting the reference signals from each of the plurality of antennas to the communications device in correspondence with the signals representing the data. However the communications resource elements which are used to transmit the reference signals from each antenna are different for each antenna and the same in the first mode of operation as the second mode of operation. Therefore, each data segment is transmitted in a PRB, but only from one antenna or subset of antennas (if Alamouti precoding is used) but with the reference signals which are assigned to that antenna.

Example Implementation

As an example implementation of a transmitter and a receiver operating to transmit and receiver data respectively using a wireless access interface configured for the example subframe shown in FIG. 13 may provide a mapping of modulation symbols to antenna ports as illustrated below. This mapping considers the following system configuration:

| Parameter | Value |
|---|---|
| System bandwidth | 1.4 MHz (6PRB) |
| Number of OFDM symbols for control channels | 3 |
| Number of transmit antennas for eNodeB | 2 |
| Number of PRB that PDSCH is mapped to | 6 |
| Modulation applied to PDSCH | QPSK |

In this case, a shared data channel such as a PDSCH for an LTE wireless access interface consists of 264 modulation symbols mapped to slot 0 and 456 modulation symbols mapped to slot 1 (giving a total of 720 modulation symbols).

If the input symbols stream to the layer mapper function 1110 of the transmitter of FIG. 12a is denoted as $a_0, a_1, \ldots a_{719}$ then the output of the transmitter layer mapper function 1170 for two transmit antennas is two identical streams, $b_0^0, b_1^0, \ldots b_{719}^0$ and $b_0^1, b_1^1, \ldots b_{719}^1$ where $b_0^x, b_1^x \ldots b_{719}^x = a_0, a_1, \ldots a_{719}$ The transmitter precoder 1112 produces sets of active bit streams for the first antenna port AP0 ($c_i^0$) and the second antenna port AP1 ($c_i^1$) where, in line with the LTE mapping to resource elements where the first slot of a subframe is mapped before the second slot is mapped, the bit streams are as expressed in the following table:

| i = modulation symbol index | AP0 modulation stream: ci0 | AP0 modulation stream: ci1 |
|---|---|---|
| 0 ... 43 | $b_0^0, b_1^0, \ldots b_{43}^0$ | inactive |
| 44 ... 87 | Inactive | $b_{44}^1, b_{45}^1, \ldots b_{87}^1$ |
| 88 ... 131 | $b_{88}^0, b_{89}^0, \ldots b_{131}^0$ | inactive |
| 132 ... 175 | Inactive | $b_{132}^1, b_{133}^1, \ldots b_{175}^1$ |
| 176 ... 219 | $b_{176}^0, b_{177}^0, \ldots b_{219}^0$ | inactive |
| 220 ... 263 | inactive | $b_{220}^1, b_{221}^1, \ldots b_{263}^1$ |
| 264 ... 339 | $b_{264}^0, b_{265}^0, \ldots b_{339}^0$ | inactive |
| 340 ... 415 | inactive | $b_{340}^1, b_{341}^1, \ldots b_{415}^1$ |
| 416 ... 491 | $b_{416}^0, b_{417}^0, \ldots b_{491}^0$ | inactive |
| 492 ... 567 | inactive | $b_{492}^1, b_{493}^1, \ldots b_{567}^1$ |
| 568 ... 643 | $b_{568}^0, b_{569}^0, \ldots b_{719}^0$ | inactive |
| 644 ... 719 | inactive | $b_{644}^1, b_{645}^1, \ldots b_{719}^1$ |

Thus, as represented in the table above, the data for transmission is mapped into data segments for transmission in each PRB from a different antenna (AP0, AP1).

Figure 13:
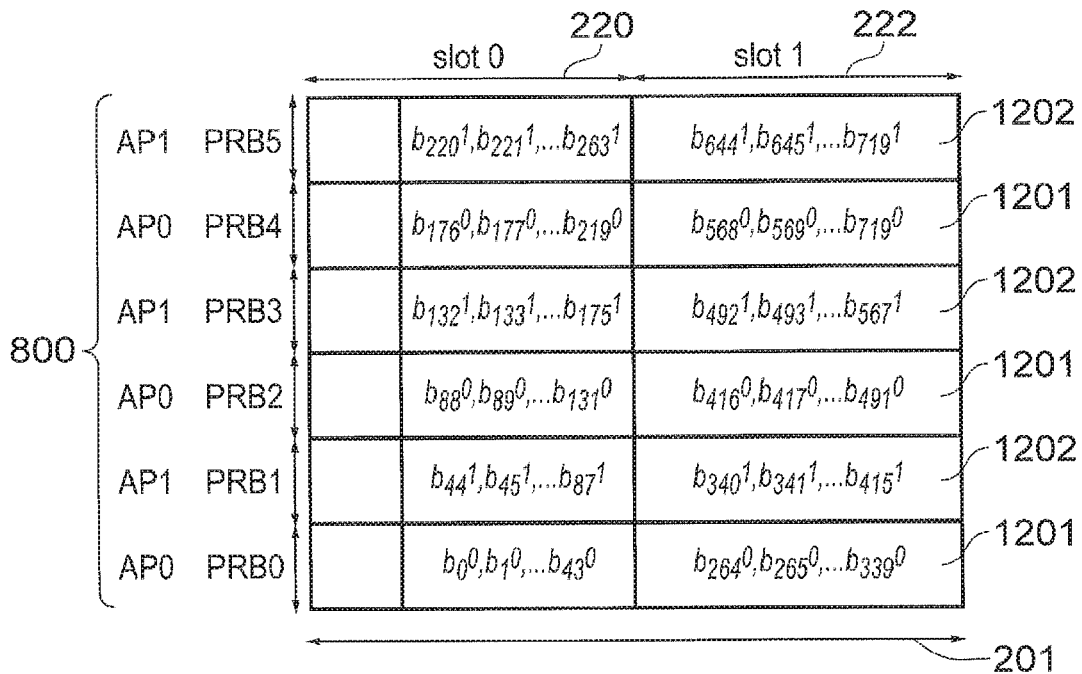
FIG. 13 provides a schematic representation of an example subframe of the downlink of the wireless access interface shown in FIG. 2, which is transmitted by an infrastructure equipment according to the present technique using two antenna ports AP0, AP1 with data symbols divided into segments and transmitted in different physical resource blocks.
Figure 14:
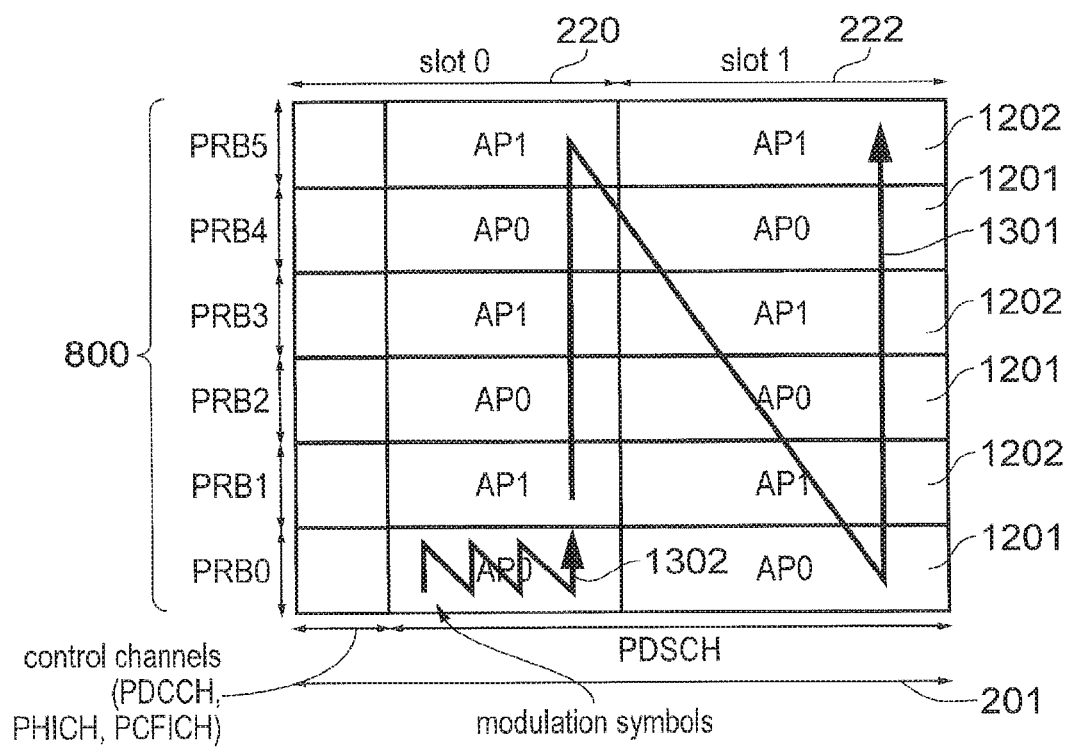
FIG. 14 provides a schematic representation illustrating a process of transmitting the data symbols shown in FIG. 13.

FIG. 13 provides a representation of a subframe 201 with a mapping of modulation symbols to PRBs and antenna ports according to this example and the table above. As shown in FIG. 13 the PRBs are transmitted on alternate antenna ports AP0, AP1 so that even PRBs 1201 are transmitted on the first antenna port AP0 and the odd PRBs 1202 are transmitted on the second antenna AP1. This mapping order is consistent with the LTE order of mapping to resource elements. FIG. 14 shows schematically an arrangement in which the modulation symbols presented in FIG. 13 are mapped in order as shown by the arrow 1301, 1302. FIG. 14 therefore shows the LTE order of mapping to resource elements 1301, 1302 overlaid on the mapping to antenna ports AP0, AP1 and PRBs.

Simulation Results

Figure 15:
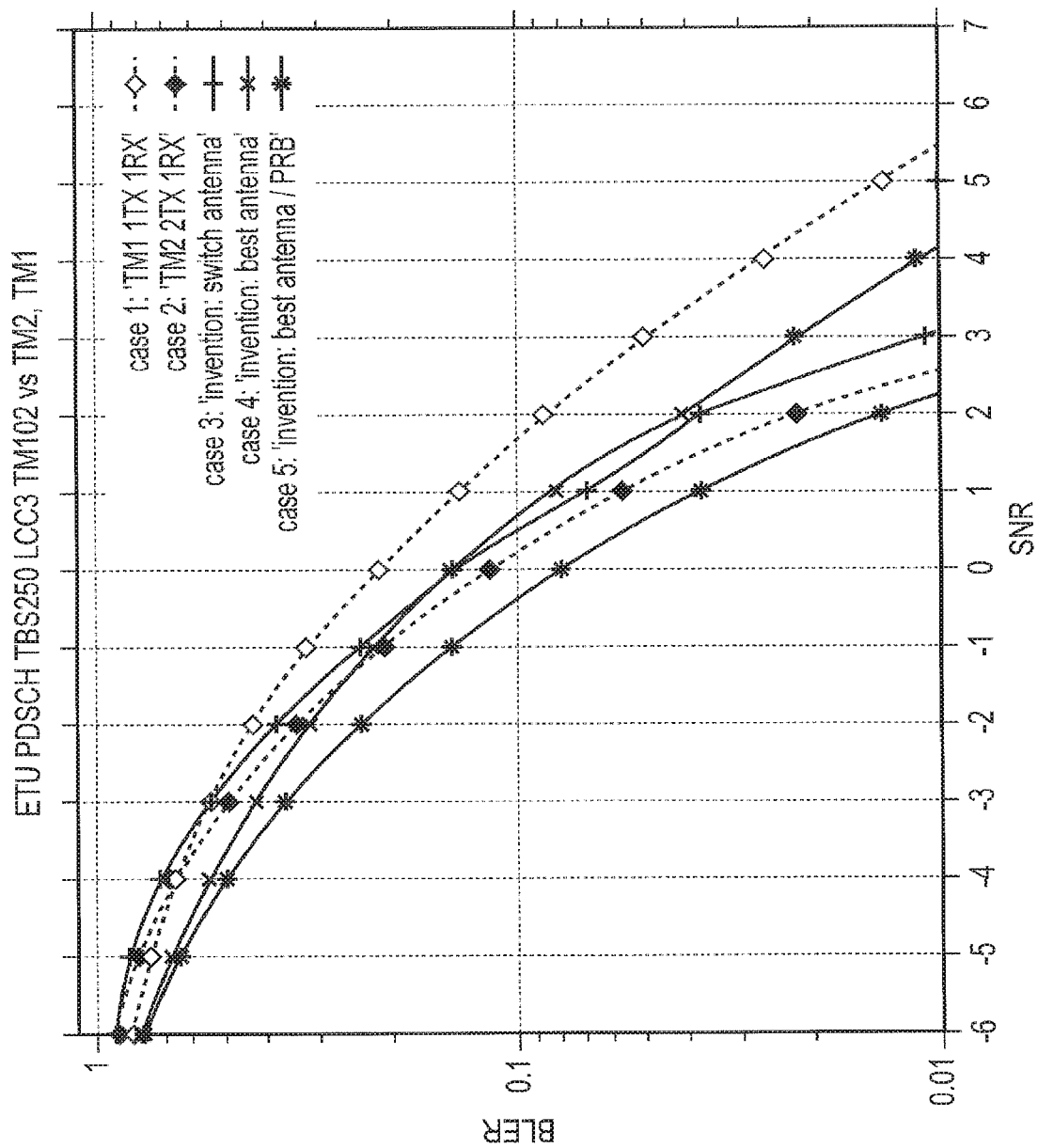
FIG. 15 provides a graphical representation of simulation results showing block error rate with respect to signal to noise ratio for different example cases including example for a conventional transmitter and receiver chain and examples for a transmitter and receiver chain embodying the present technique for an ETU channel.

FIG. 15 provides a graphical representation of simulation results presenting a block error rate with respect to signal to noise ratio for different simulated cases shown in the table below. The example cases simulated in the results shown in FIG. 15 provide a comparison of an example of a simulated performance of the conventional transmitter and receiver and a transmitter and a receiver configured in accordance with embodiment of the present technique. The simulations are performed in an ETU channel with a system bandwidth of 1.4 MHz. This channel is frequency selective across this system bandwidth. The following table summarises features of the various cases shown in FIG. 15.

| case | scheme | RX complexity | performance |
| --- | --- | --- | --- |
| 1 prior art | LTE TM1. 1TX antenna, 1 RX antenna | Single channel estimator | Worst performance |
| 2 prior art | LTE TM2. Alamouti scheme. 2 TX antenna, 1 RX antenna | Two channel estimators | Improved performance through transmit diversity |
| 3 example embodiment | Open loop antenna switching. Antenna switched every PRB | Single channel estimator | Performance similar to TM2 (prior art: case 2), but complexity of receiver is less |
| 4 example embodiment | Closed loop antenna switching across entire system bandwidth | Single channel estimator Antenna selection function required | Superior to TM1 (prior art: case 1), at similar receiver complexity |
| 5 example embodiment | Closed loop antenna switching; best antenna chosen for each PRB | Single channel estimator Antenna selection function required | Best performance, yet only a single channel estimator is required |

Figure 16:
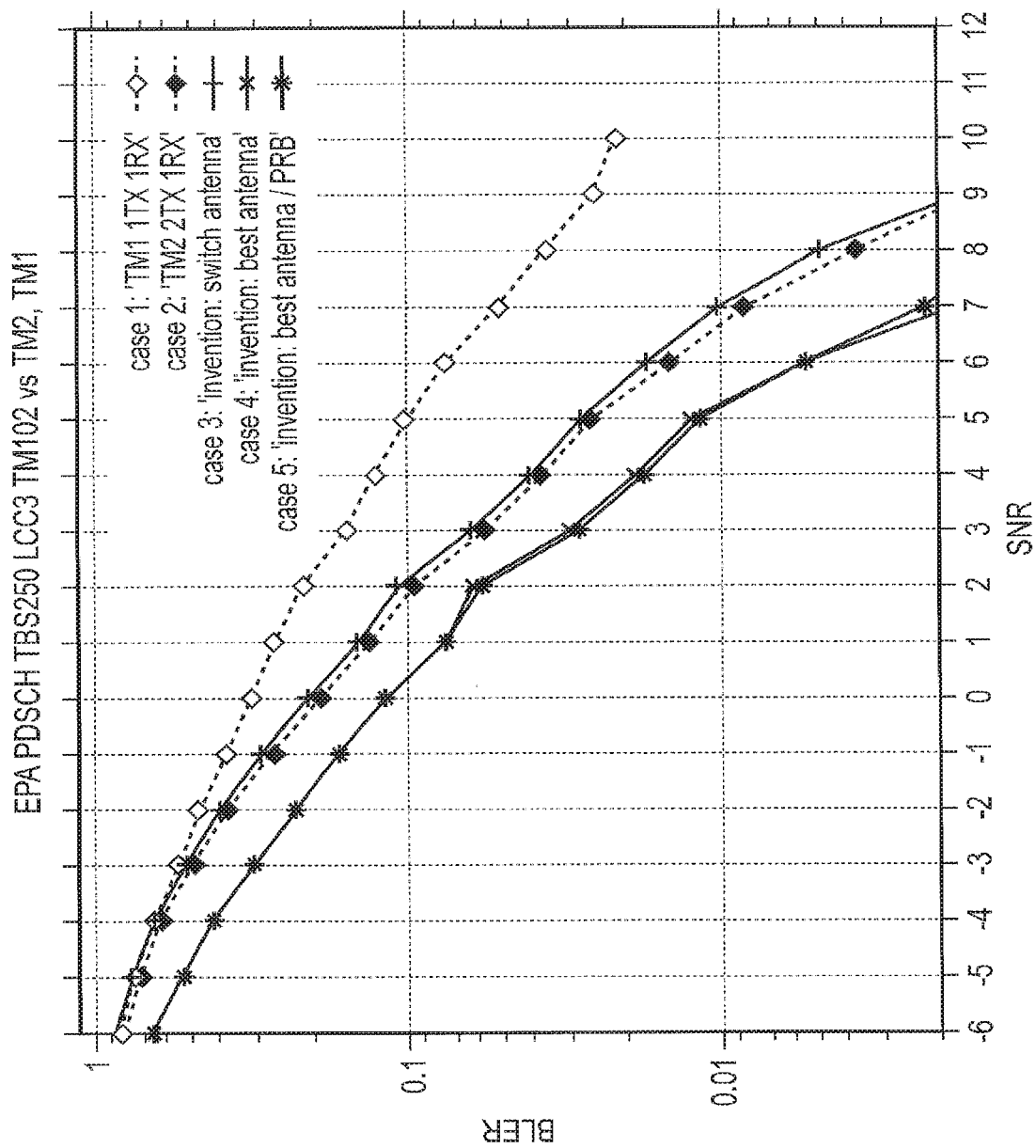
FIG. 16 provides a graphical representation of simulation results showing block error rate with respect to signal to noise ratio for different example cases including examples for a conventional transmitter and receiver chain and examples for a transmitter and receiver chain embodying the present technique for an EPA channel.

FIG. 16 provides a graphical representation of simulation results showing a performance of the conventional system and a transmitter and a receiver configured in accordance with the present technique in an EPA channel. This channel is less frequency selective than the ETU channel considered in FIG. 15.

In this less frequency selective channel, the open loop performance of the present technique (case 3) is similar to the performance of the prior art transmit mode 2 (case 2), but at a lower UE complexity. The closed loop performance of the present technique is superior to that of the prior art (case 2) and it makes little difference whether the closed loop feedback is on a per-PRB basis (case 5) or based on the whole system bandwidth (case 4). There is little difference between the case 4 and case 5 performance since the channel is not particularly frequency selective (the best antenna for one PRB is likely to also be the best antenna for all the other PRBs).

Figure 17:
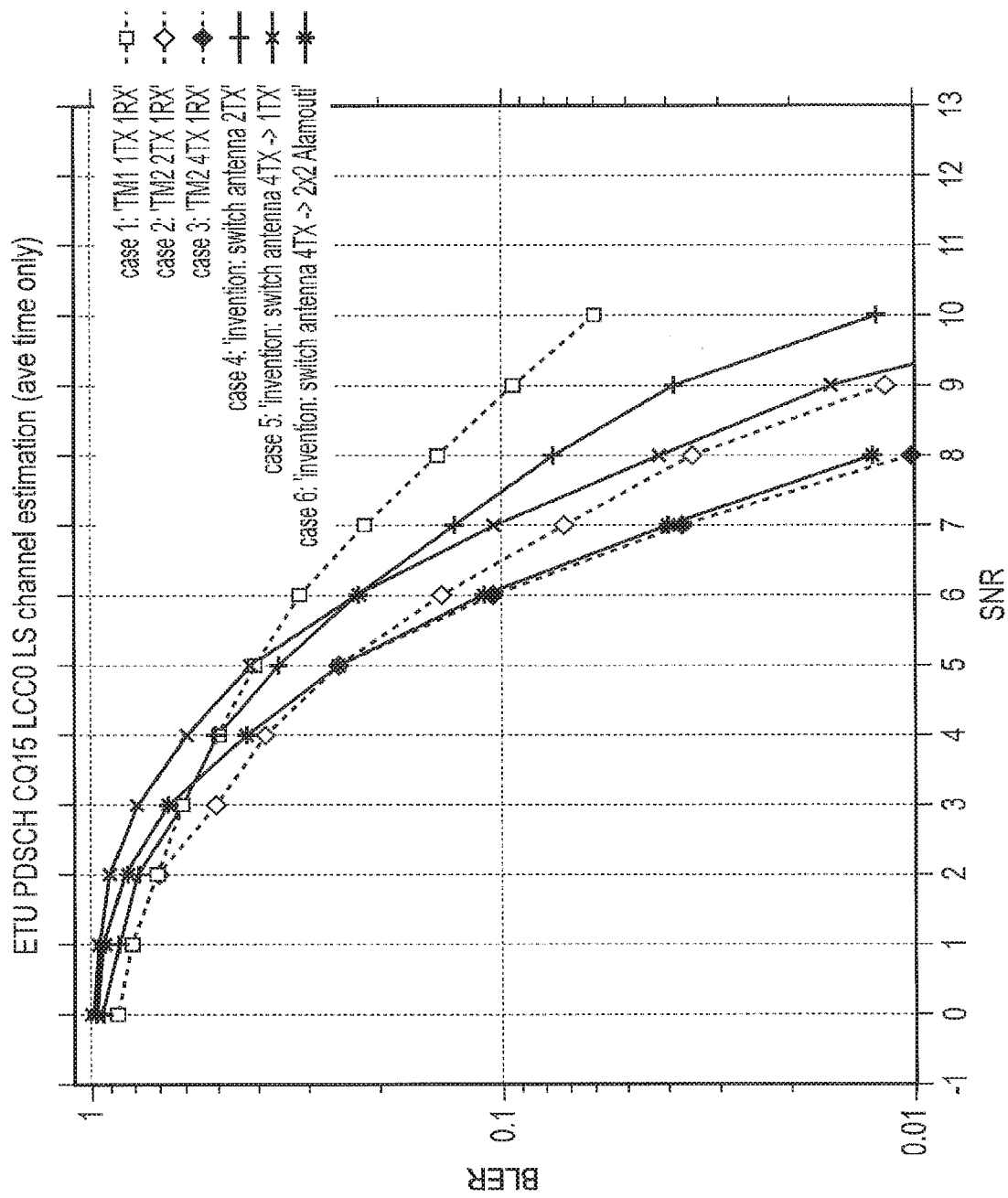
FIG. 17 provides a graphical representation of simulation results showing block error rate with respect to signal to noise ratio for different example cases including examples for a conventional transmitter and receiver chain and examples for a transmitter and receiver chain embodying the present technique for an ETU channel with simulated channel estimation.

FIG. 17 shows a performance comparison of the prior art and a transmitter and a receiver embodying the present technique using a realistic channel estimation in an ETU channel. FIG. 17 also includes scenarios with four transmit antennas (case 3, case 5 and case 6).

In a realistic channel environment, the four transmit antenna switching scheme (case 5) shown in FIG. 17 is similar to the performance of the prior art TM2 two transmit antenna Alamouti scheme (case 2) but at a lower complexity. In addition there is a significant performance improvement of the transmitter and receiver pair embodying the present technique for a case of four transmit antenna switching (case 5) compared with a two transmit antenna switching case (case 4), if the eNodeB can support four antenna transmission. Furthermore, the performance of the prior art TM2 four transmit antenna Alamouti scheme (case 3) is almost identical with the case with four transmit antenna switching with pairs of two transmit antennas and Alamouti precoding (case 6) but at a higher complexity, hence the present technique provides an equivalent performance to the prior art technique, but at a lower complexity.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

Summary of Advantages

Embodiments of the present technique can provide an advantage in that a lower complexity channel estimation is required compared to conventional transmit antenna diversity schemes. Furthermore a closed loop scheme can have a better performance than an LTE standard TM2 Alamouti-based coding scheme with two transmit antennas, with a lower channel estimation complexity than that required by the Alamouti-based scheme. However the open loop performance of the scheme, such as for example a switched antenna transmit diversity without feedback from the UE, can be worse than that of the TM2 Alamouti-based scheme using the same number of transmit antennas. However the channel estimation complexity is reduced when employing the present technique compared to that of the prior art TM2 Alamouti-based scheme.

Embodiments of the present technique utilise at least two PRBs. If a UE is allocated with a single PRB, then this single PRB will only be associated with a single antenna port. However many MTC devices are in poor channel conditions or have impaired coverage, for example due to only having a single receiver chain. Hence most MTC devices would be allocated with more than a single PRB. Furthermore, instead of switching antenna ports between PRBs, antenna ports could be switched between slots (slot 0 uses AP0, slot 1 uses AP1), as per FIG. 10. Potentially this mode of operation would only be applied for single PRB transmission to a UE. This is because the eNodeB and UE would contain logic that controls its operation so that if the transmission is a multiple PRB transmission, it use an arrangement in accordance with an embodiment of the present technique, else if the transmission is a single PRB transmission, use different antenna ports for the different timeslots of the transmission.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 2, UE1 has been allocated resources 208 of the data region 206. UE2 resources 209 and UE3 resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH. Each uplink subframe may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made contiguous frequency allocations for each UE are preferable.

Various further aspects and features of the present technique are defined in the following numbered paragraphs:

1. An infrastructure equipment for a mobile communications network, the infrastructure equipment comprising:
   a transmitter configured to transmit signals to one or more communications devices via a wireless access interface comprising in each of a plurality of time divided units a plurality of communications resource elements, and
   a receiver configured to receive signals from the one or more communications devices via the wireless access interface, and
   a controller configured to control the transmitter and the receiver to transmit the signals to the one or more communications devices and to receive the signals from the one or more communications devices, wherein the transmitter includes a plurality of antennas, and the controller is configured to control the transmitter, in a first mode of operation.
   to transmit, from each of the plurality of antennas, reference signals in communications resource elements of the wireless access signals allocated by the controller to each of the plurality of antennas, the reference signals being transmitted from each of the antennas in different communications resource elements of the wireless access interface for each antenna, so that a receiver can estimate a communications channel for each of the plurality of antenna, from the antenna to the receiver, from the transmitted reference signals, and
   to transmit, from each of the plurality of antennas, signals representing data in communications resource elements allocated by the controller for transmitting the data to a first of the communications devices, the signals representing the data being transmitted contemporaneously in the same communications resource elements from each antenna with the reference signals, and, in a second mode of operation
   to determine a mapping for transmitting different data segments from each of a plurality of subsets of the plurality of antennas to a second communications device using communications resource elements, which, for each antenna subset, are separated in at least one of time or frequency,
   to transmit an indication of the mapping for transmitting the data segments from each of the subsets of antennas to the second communications device.
   to switch between transmitting signals representing the different data segments between the subsets of the plurality of antennas to the second communications device, the signals being transmitted from each antenna subset representing different data segments for transmission to the second communications device, the transmitted signals being switched in at least one of time or frequency in accordance with the mapping so that to detect the data a receiver is required to generate a smaller number of channel estimates than the receiver would be required to estimate if the data was transmitted in the first mode, wherein the communications resource elements which are used to transmit the reference signals from each antenna are the same in the first mode of operation as the second mode of operation.

2. An infrastructure equipment according to paragraph 1, wherein the wireless access interface includes within each time unit a plurality of physical resource blocks comprises communications resource elements within a predetermined frequency bandwidth, and the controller is configured to control the transmitter in the second operating mode
   to form the data to be transmitted into a plurality of data segments for transmission in each of a plurality of physical resource blocks.
   to determine a mapping of the data segments for transmission in one or more of the physical resource blocks from one of the subsets of the plurality of antennas.
   to transmit each data segment in the one or more physical resource blocks from the subset of the plurality of antennas with the reference signals in the communications resource elements for each of the antennas on the subset of the plurality of antennas in accordance with the determined mapping.

3. An infrastructure equipment according to paragraph 2, wherein the wireless access interface includes within each time unit a plurality of time slots, and the controller is configured to control the transmitter
   to map each of the one or more data segments for transmission in the one or more physical resource blocks for transmission in one or more of the plurality of time slots, and
   to transmit each data segment using one or more of the physical resource blocks in one or more of the plurality of time slots from one of the sub-sets of the plurality of antennas in accordance with the determined mapping.

4. An infrastructure equipment according to paragraph 3, wherein the transmitter is configured
   to precode modulation symbols of the signals representing the data segment for transmission from the sub-sets of the plurality of antennas in accordance with the antenna of the sub-set from which the data is to be transmitted, and
   to transmit the precoded modulation symbols from each antenna of the subset of antennas.

5. An infrastructure equipment according to paragraph 4, wherein the precoding includes Alamouti encoding.

6. An infrastructure equipment according to any of paragraphs 1 to 5, wherein the controller is configured with the receiver
   to receive from the communications device an indication of one or more communications parameters relating to a relative likelihood of receiving a data segment from for one or more of the plurality of antennas, and the controller is configured
   to allocate the data segments to each of the subsets of the plurality of antennas based upon the received one or more communications parameters.

7. An infrastructure equipment according to any of paragraphs 1 to 6, wherein the controller is configured with the transmitter
   to switch between transmitting the reference signals from each of the subsets of the plurality of antennas to the second communications device in correspondence with the signals representing the data segments, the reference signals being different for each of the subsets of the plurality of antennas and the same in the first mode of operation as the second mode of operation.

8. An infrastructure equipment according to any of paragraphs 3 to 7, wherein the plurality of antennas comprises two antennas, and each subset comprises one antenna and the controller is configured to control the transmitter
   to allocate each of the segments of data to a physical resource block and a time slot for transmission from one of the antennas.

9. An infrastructure equipment according to any of paragraphs 1 to 7, wherein the second communications device is less complex than the first communications device.

REFERENCES

[1] LTE for UMTS: OFDMA and SC-FDMA Based Radio Access, Harris Holma and Antti Toskala, Wiley 2009, ISBN 978-0-470-99401-6.
[2] 3GPP TS36.211 sections 6.3.4.1, 6.3.4.2
[3] "Further Discussion on Reference Signals for E-PDCCH". RIM UK Ltd. RAN1#68
[4] S. Sesia, I Toufik and M. Baker, "*LTE The UMIS Long Term Evolution: From Theory to Practice*", 2$^{nd}$ Edition, Wiley,
[5] 3GPP TS36.211 section 6.3.4.2.3
[6] 3GPP TS36.213 section 7.2.4
[7] 4G LTE/LTE-Advanced for Mobile Broadband" by E. Dahlman et al.
[8] 3GPPTS36.211 section 6.3.3.3

The present application claims priority to European Patent Application 15163295.7, filed in the European Patent Office on 10 Apr. 2015, the entire contents of which being incorporated herein by reference.

What is claimed is:

1. An infrastructure equipment for a mobile communications network, the infrastructure equipment comprising,
a transmitter configured to transmit signals to one or more communications devices via a wireless access interface comprising in each of a plurality of time divided units a plurality of communications resource elements, and
a receiver configured to receive signals from the one or more communications devices via the wireless access interface, and
a controller configured to control the transmitter and the receiver to transmit the signals to the one or more communications devices and to receive the signals from the one or more communications devices, wherein the transmitter includes a plurality of antennas, and the controller is configured to control the transmitter, in a first mode of operation,
to transmit, from each of the plurality of antennas, reference signals in communications resource elements of the wireless access signals allocated by the controller to each of the plurality of antennas, the reference signals being transmitted from each of the antennas in different communications resource elements of the wireless access interface for each antenna, and
to transmit, from each of the plurality of antennas, signals representing data in communications resource elements allocated by the controller for transmitting the data to a first of the communications devices, the signals representing the data being transmitted contemporaneously in the same communications resource elements from each antenna with the reference signals, and, in a second mode of operation
to determine a mapping for transmitting different data segments from each of a plurality of subsets of the plurality of antennas to a second communications device using communications resource elements, which, for each antenna subset, are separated in at least one of time or frequency,
to transmit an indication of the mapping for transmitting the data segments from each of the subsets of antennas to the second communications device,
to switch between transmitting signals representing the different data segments between the subsets of the plurality of antennas to the second communications device, the signals being transmitted from each antenna subset representing different data segments for transmission to the second communications device, the transmitted signals being switched in at least one of time or frequency in accordance with the mapping.

2. The infrastructure equipment of claim 1, wherein the wireless access interface includes within each time unit a plurality of physical resource blocks comprising communications resource elements within a predetermined frequency bandwidth, and the controller is configured to control the transmitter in the second operating mode
to form the data to be transmitted into a plurality of data segments for transmission in each of a plurality of physical resource blocks,
to determine a mapping of the data segments for transmission in one or more of the physical resource blocks from one of the subsets of the plurality of antennas,
to transmit each data segment in the one or more physical resource blocks from the subset of the plurality of antennas with the reference signals in the communications resource elements for each of the antennas on the subset of the plurality of antennas in accordance with the determined mapping.

3. The infrastructure equipment of claim 2, wherein the wireless access interface includes within each time unit a plurality of time slots, and the controller is configured to control the transmitter
to map each of the one or more data segments for transmission in the one or more physical resource blocks for transmission in one or more of the plurality of time slots, and
to transmit each data segment using one or more of the physical resource blocks in one or more of the plurality of time slots from one of the sub-sets of the plurality of antennas in accordance with the determined mapping.

4. The infrastructure equipment of claim 3, wherein the transmitter is configured
to precode modulation symbols of the signals representing the data segment for transmission from the sub-sets of the plurality of antennas in accordance with the antenna of the sub-set from which the data is to be transmitted, and
to transmit the precoded modulation symbols from each antenna of the subset of antennas.

5. The infrastructure equipment of claim 4, wherein the precoding includes Alamouti encoding.

6. The infrastructure equipment of claim 1, wherein the controller is configured with the receiver
to receive from the communications device an indication of one or more communications parameters relating to a relative likelihood of receiving a data segment from for one or more of the plurality of antennas, and the controller is configured
to allocate the data segments to each of the subsets of the plurality of antennas based upon the received one or more communications parameters.

7. The infrastructure equipment of claim 1, wherein the controller is configured with the transmitter
to switch between transmitting the reference signals from each of the subsets of the plurality of antennas to the second communications device in correspondence with the signals representing the data segments, the reference signals being different for each of the subsets of the plurality of antennas and the same in the first mode of operation as the second mode of operation.

8. The infrastructure equipment of claim 3, wherein the plurality of antennas comprises two antennas, and each subset comprises one antenna and the controller is configured to control the transmitter to allocate each of the segments of data to a physical resource block and a time slot for transmission from one of the antennas.

9. The infrastructure equipment of claim 1, wherein the second communications device is less complex than the first communications device.

10. A communications device for receiving data transmitted from an infrastructure equipment of a mobile communications network, the infrastructure equipment including a plurality of antennas and being configured to operate in a first mode of operation, to transmit, from each of the plurality of antenna, reference signals in communications resource elements of a wireless access signals allocated to each of the plurality of antennas, the reference signals being transmitted from each of the antennas in different communications resource elements of the wireless access interface for each antenna, and to transmit, from each of the plurality of antennas, signals representing data contemporaneously in the same communications resource elements from each antenna, and, in a second mode of operation to switch between transmitting signals representing different segments of data from each of a plurality of subsets of the plurality of antennas, the signals being transmitted from each antenna subset representing a data segment, the transmitted signals being switched in at least one of time or frequency, the communications resource elements which are used to transmit the reference signals from each antenna being different for each antenna and the same as the first mode of operation as the second mode of operation, the communications device comprising:

circuitry configured to control transmission of signals to the infrastructure equipment and reception of signals from infrastructure equipment, wherein the circuitry is configured to receive signals representing data transmitted from the infrastructure equipment in the second mode of operation by receiving an indication from the infrastructure equipment identifying, for each of the plurality of antennas, which of the subsets of the plurality of antennas was used by the infrastructure equipment to transmit the signals representing different segments of data, the signals having been switched in transmission between subsets of the plurality of antennas in accordance with the second mode of operation, and identifying, for each of the plurality of antennas, the communications resources elements of the wireless access interface in which the reference signals were transmitted for each antenna of the subset of antennas, detecting, for each antenna of the subset of the plurality of antennas, the reference signals from the identified communications resource elements, and estimating, for each antenna of the subset of the plurality of antennas, a communications channel through which the signals representing the data were transmitted from each antenna in correspondence with the subset of the plurality of antennas from which the signals were transmitted using the detected reference signals for the antenna.

11. The communications device of claim 10, wherein the circuitry is configured to determine from the detected signals one or more communications parameters, which provide for each antenna an indication of a relative likelihood of correctly receiving data from the antenna, and transmit, to the infrastructure equipment, an indication of the one or more communications parameters for each of the plurality of antennas, the infrastructure equipment using the one or more communications parameters to select the subsets of antenna between which the signals representing the data are transmitted.

12. Circuitry for an infrastructure equipment for a mobile communications network, the circuitry comprising, transmitter circuitry configured to transmit signals to one or more communications devices via a wireless access interface comprising in each of a plurality of time divided units a plurality of communications resource elements, and receiver circuitry configured to receive signals from the one or more communications devices via the wireless access interface, and controller circuitry configured to control the transmitter and the receiver to transmit the signals to the one or more communications devices and to receive the signals from the one or more communications devices, wherein the transmitter circuitry includes a plurality of antennas, and the controller circuitry is configured to control the transmitter circuitry, in a first mode of operation, to transmit, from each of the plurality of antennas, reference signals in communications resource elements of the wireless access signals allocated by the controller to each of the plurality of antennas, the reference signals being transmitted from each of the antennas in different communications resource elements of the wireless access interface for each antenna, and to transmit, from each of the plurality of antennas, signals representing data in communications resource elements allocated by the controller for transmitting the data to a first of the communications devices, the signals representing the data being transmitted contemporaneously in the same communications resource elements from each antenna with the reference signals, and, in a second mode of operation to determine a mapping for transmitting different data segments from each of a plurality of subsets of the plurality antennas to a second communications device using communications resource elements, which, for each antenna subset, are separated in at least one of time or frequency, to transmit an indication of the mapping for transmitting the data segments from each of the subsets of antennas to the second communications device, to switch between transmitting signals representing the different data segments between the subsets of the plurality of antennas to the second communications device, the signals being transmitted from each antenna subset representing different data segments for transmission to the second communications device, the transmitted signals being switched in at least one of time or frequency in accordance with the mapping.

* * * * *